US007612759B2

(12) United States Patent
Horiuchi

(10) Patent No.: US 7,612,759 B2
(45) Date of Patent: Nov. 3, 2009

(54) CYCLE COMPUTER DISPLAY APPARATUS

(75) Inventor: Noriyuki Horiuchi, Higashiosaka (JP)

(73) Assignee: Shimano Inc., Osaka (JP)

( * ) Notice: Subject to any disclaimer, the term of this patent is extended or adjusted under 35 U.S.C. 154(b) by 502 days.

(21) Appl. No.: 10/843,311

(22) Filed: May 12, 2004

(65) Prior Publication Data

US 2005/0253820 A1 Nov. 17, 2005

(51) Int. Cl.
*G06F 3/041* (2006.01)
*A63B 22/06* (2006.01)
*G09G 3/36* (2006.01)

(52) U.S. Cl. .................. 345/104; 345/173; 482/57; 715/825

(58) Field of Classification Search ......... 345/173–178, 345/104; 178/18.01–18.05; 715/825; 482/4, 482/8, 9, 54, 57
See application file for complete search history.

(56) References Cited

U.S. PATENT DOCUMENTS

| 5,054,774 A * | 10/1991 | Belsito ........................ 482/5 |
| 5,422,656 A | 6/1995 | Allard et al. |
| 5,589,856 A | 12/1996 | Stein et al. |
| 6,069,648 A | 5/2000 | Suso et al. |
| 6,069,788 A | 5/2000 | Masui |
| 6,084,506 A | 7/2000 | Irie |
| 6,192,300 B1 | 2/2001 | Watarai et al. |
| 6,388,871 B1 | 5/2002 | Masui |
| 6,406,049 B1 | 6/2002 | Jimison et al. |
| 6,430,040 B1 | 8/2002 | Masui |
| 6,477,341 B2 * | 11/2002 | Nomura et al. ............... 399/81 |
| 6,547,702 B1 | 4/2003 | Heidecke |
| 6,786,848 B2 * | 9/2004 | Yamashita et al. ............ 482/8 |
| 6,796,927 B2 * | 9/2004 | Toyama ........................ 482/8 |
| 6,971,973 B2 * | 12/2005 | Cohen et al. .................. 482/8 |

FOREIGN PATENT DOCUMENTS

| DE | 19531766 A1 | 3/1997 |
| DE | 20115816 U1 | 3/2002 |
| EP | 0898405 A | 2/1999 |
| JP | 11-083523 A | 3/1999 |
| JP | 2000/339550 A | 12/2000 |
| JP | 2001-059739 A | 3/2001 |

* cited by examiner

*Primary Examiner*—Jimmy H Nguyen
(74) *Attorney, Agent, or Firm*—Global IP Counselors, LLP

(57) ABSTRACT

A cycle computer display apparatus is provided with a touch panel for the rider to input data into the cycle computer. The cycle computer includes a display screen for producing visual images and a controller that selectively controls the visual images and the touch panel such that sensor areas of the touch panel are correlated to images formed on the display screen. Preferably, the controller produces several different display modes with button images of different sizes. The controller further correlates the touch panel to the different size button size images so that when the rider touches the touch panel in the area corresponding to the button image, the appropriate control program is executed by the controller.

17 Claims, 26 Drawing Sheets

CYCLE COMPUTER DISPLAY APPARATUS

BACKGROUND OF THE INVENTION

1. Field of the Invention

This invention generally relates to a cycle computer display apparatus for a bicycle. More specifically, the present invention relates to a cycle computer display apparatus having a touch screen.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Recently, bicycles have been equipped with electrical components to make riding easier and more enjoyable for the rider. Some bicycles are equipped with automatic shifting units that are automatically adjusted according to the riding conditions by a cycle computer or control unit. In particular, the front and rear derailleurs have recently been automated. Moreover, various electronic devices have been used to determine one or more operating parameters for controlling the derailleurs and providing information to the rider. Thus, the cycle computer or control unit of the bicycle not only provides information to the rider, but also controls various components of the bicycle.

In view of the above, it will be apparent to those skilled in the art from this disclosure that there exists a need for an improved cycle computer display apparatus. This invention addresses this need in the art as well as other needs, which will become apparent to those skilled in the art from this disclosure.

SUMMARY OF THE INVENTION

One object of the present invention is to provide cycle computer display apparatus that is relatively easy to use.

The foregoing objects can basically be attained by providing a cycle computer display apparatus that basically comprises a display screen, a touch panel input unit and a controller. The display screen is configured to produce a plurality of visual images. The touch panel input unit is superimposed on at least a portion of the display screen that output a selection signal upon being touched. The controller is configured to selectively control the visual images to produces a plurality of display modes that are displayed on the display screen in response to the selection signal that is produced by the touch panel input unit being touched. The controller is further configured to selectively display at least one first button image on the display screen and selectively define a first sensor area of the touch panel input unit that correspond to the first button image in a first display mode, and the controller being further configured to selectively display at least one second button image on the display screen and selectively define a second sensor area of the touch panel input unit that correspond to the second button image in a second display mode, the first sensor area defining the first button image of the first display defining a different size area than the second sensor area defining the first button image of the second display.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
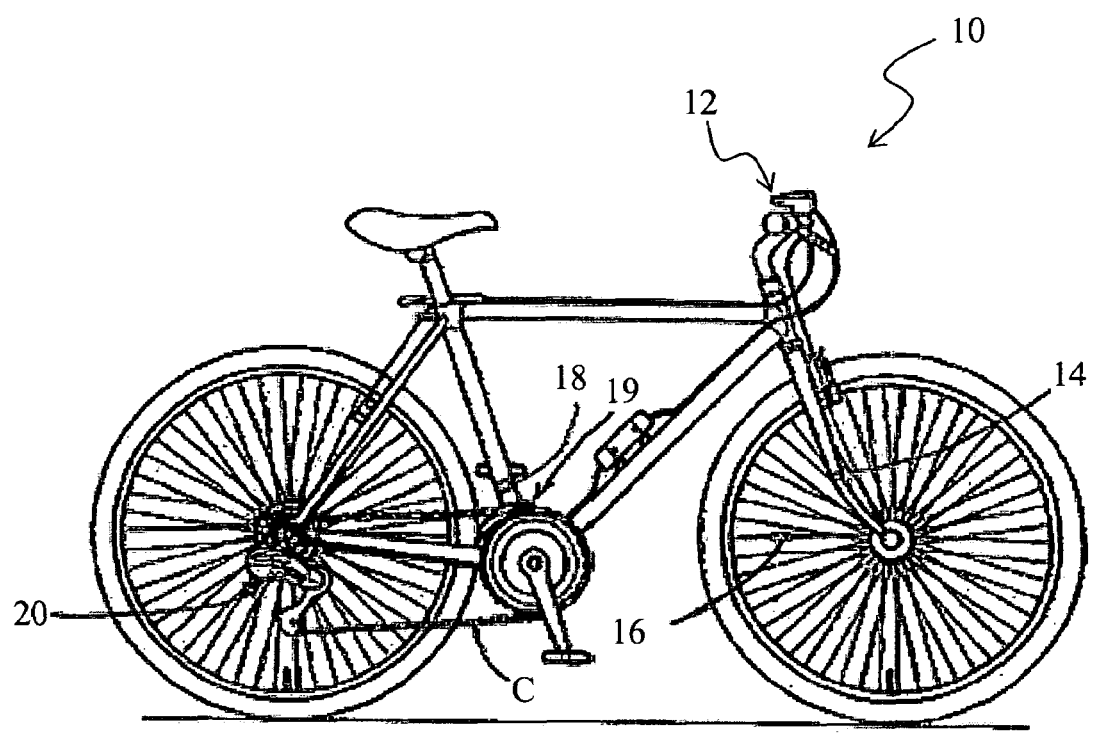
FIG. 1 is a side elevational view of a bicycle equipped with a cycle computer display apparatus in accordance with the present invention.

Referring initially to FIG. 1, a bicycle 10 is illustrated that is equipped with a cycle computer display apparatus 12. Since these parts of bicycle 10 are well known in the art, these parts will not be discussed or illustrated in detail herein, except as they are modified to be used in conjunction with the present invention. Moreover, various conventional bicycle parts, which are not illustrated and/or discussed herein, can also be used in conjunction with the present invention.

Figure 2:
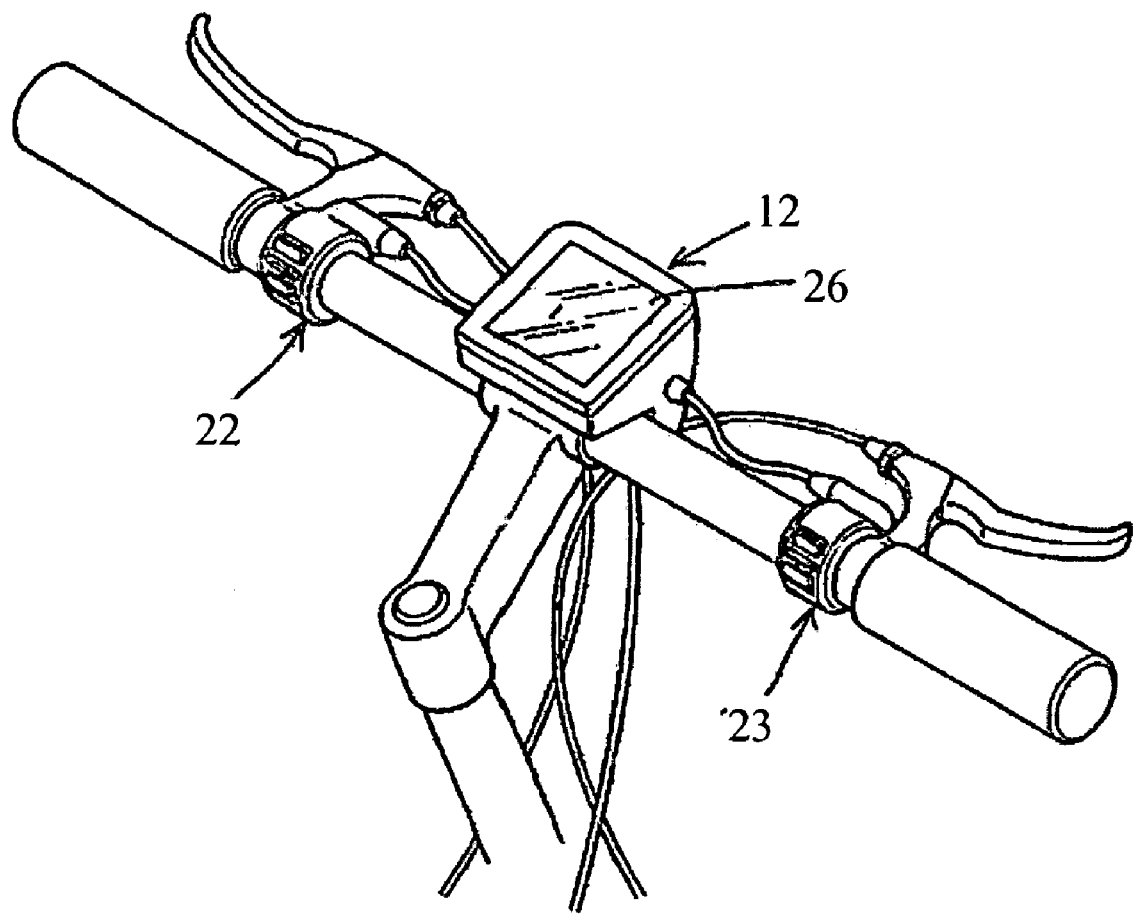
FIG. 2 is a partial top perspective view of the handlebar area of the bicycle illustrated in FIG. 1 with the cycle computer display apparatus in accordance with the present invention.

As seen in FIGS. 1 and 2, the cycle computer display apparatus 12 is operatively coupled to a wheel rotation sensor 14 that senses a magnet 16, a crank rotation sensor 18 that senses a magnet (not shown) on a left side crank arm, a motorized front derailleur 19 and a motorized rear derailleur 20.

Figure 3:
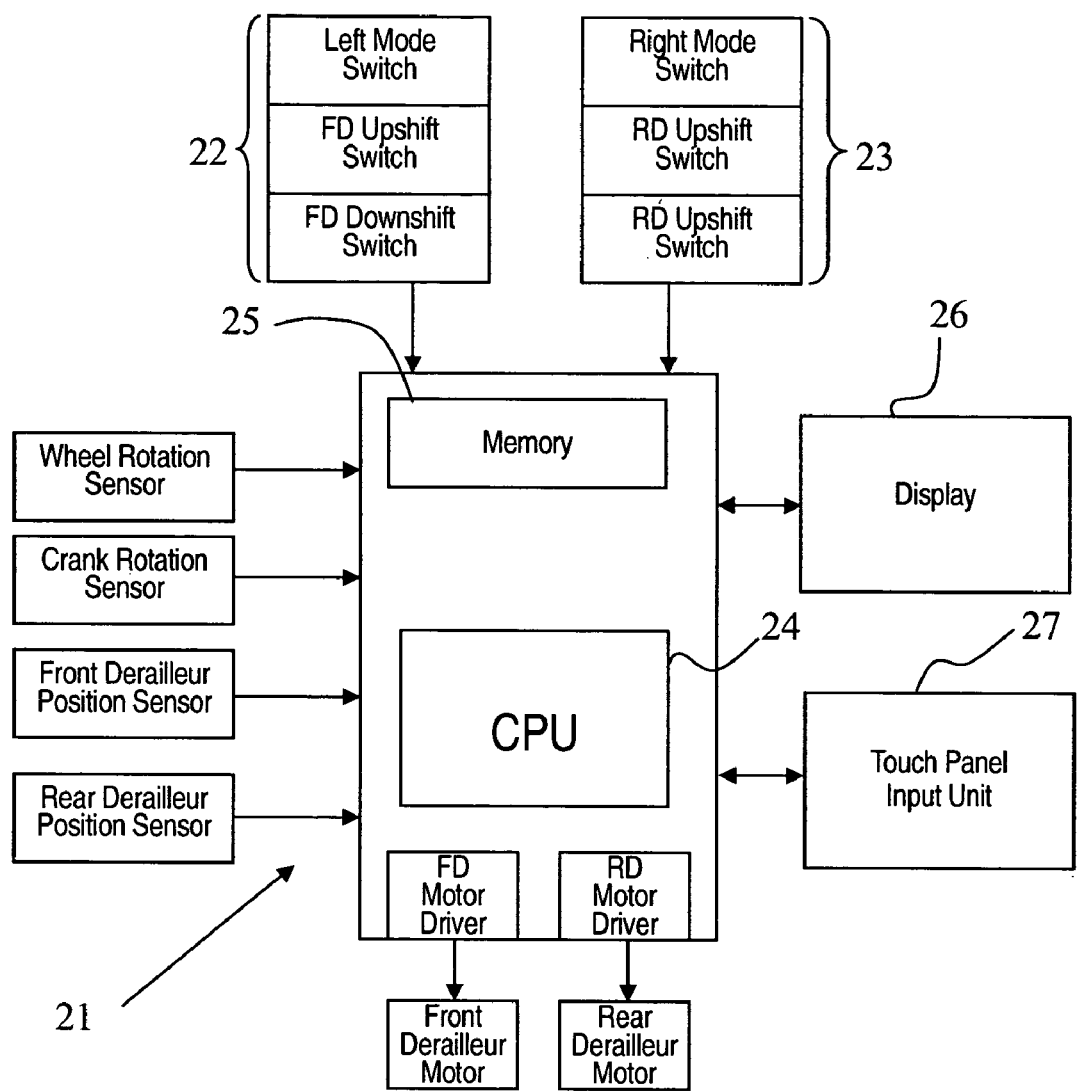
FIG. 3 is a block diagram of the electronically controlled bicycle transmission with the cycle computer display apparatus in accordance with the present invention.

Referring to FIG. 3, a block diagram of the electronically controlled bicycle transmission of the present invention is illustrated. The front and rear derailleurs 19 and 20 are operated by an electronic controller or control unit 21 that is electrically coupled to a pair of electronic shifters 22 and 23 via electric shift cables. Thus, the front and rear derailleurs 19 and 20 are operated by the rider depressing shift buttons to move a chain C between front sprockets or chain wheels and the rear gears of the bicycle drive train. Each of the electronic shifters 22 and 23 is preferably provided with a pair of shift buttons that are operatively coupled to the electronic controller 21, preferably in accordance with U.S. Pat. No. 6,073,730 (assigned to Shimano, Inc.) and U.S. Pat. No. 6,212,078 (assigned to Shimano, Inc.). Of course, the electronic controller 21 preferably includes front and rear automatic shifting programs that are activated by depressing the mode switches on the electronic shifters 22 and 23.

The electronic controller 21 is a processing mechanism that preferably includes a microcomputer 24 with various control programs such as shifting control programs and display programs. The electronic controller 21 can also include other conventional components such as an input interface circuit, an output interface circuit, and storage devices 25 such as a ROM (Read Only Memory) device and a RAM (Random Access Memory) device. The internal RAM of the electronic controller 21 stores statuses of operational flags and various control data. The controller 21 also has an LCD display 26 with a touch panel input unit 27 overlying the LCD display 26.

Figure 4:
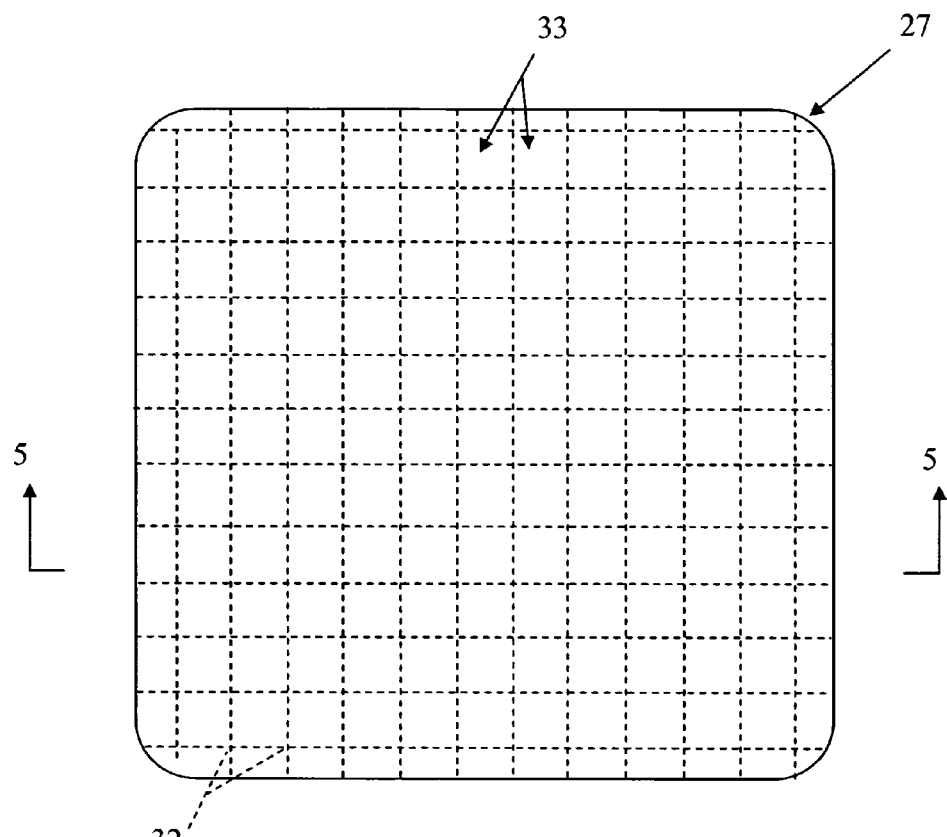
FIG. 4 is a diagrammatic top plan view of the touch screen of the cycle computer display apparatus in accordance with the present invention.
Figure 5:
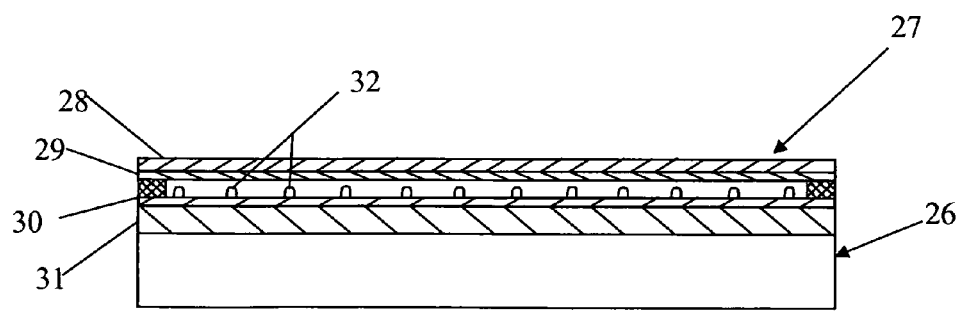
FIG. 5 is a diagrammatic cross sectional view of the touch screen of the cycle computer display apparatus as seen along section a line 5-5 of FIG. 4.
Figure 6:
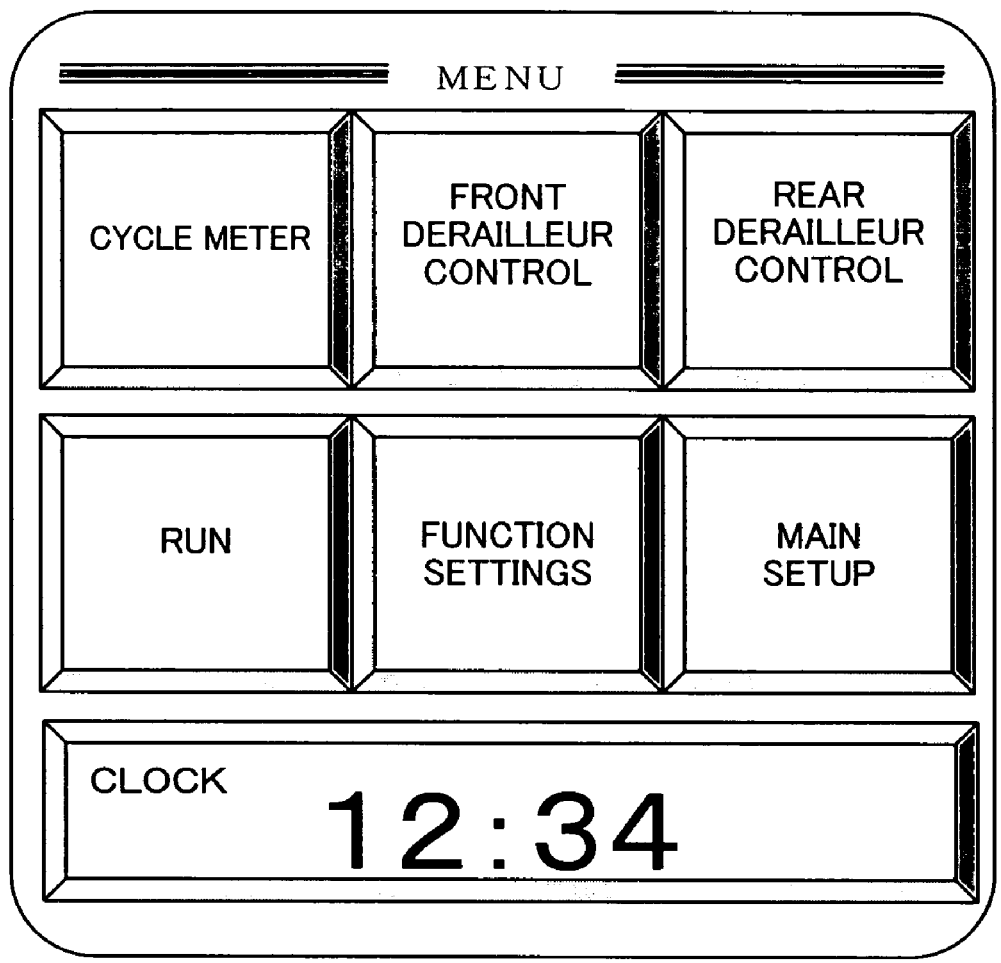
FIG. 6 is a display screen corresponding to the HOME MENU display mode of the cycle computer display apparatus in accordance with the present invention.
Figure 7:
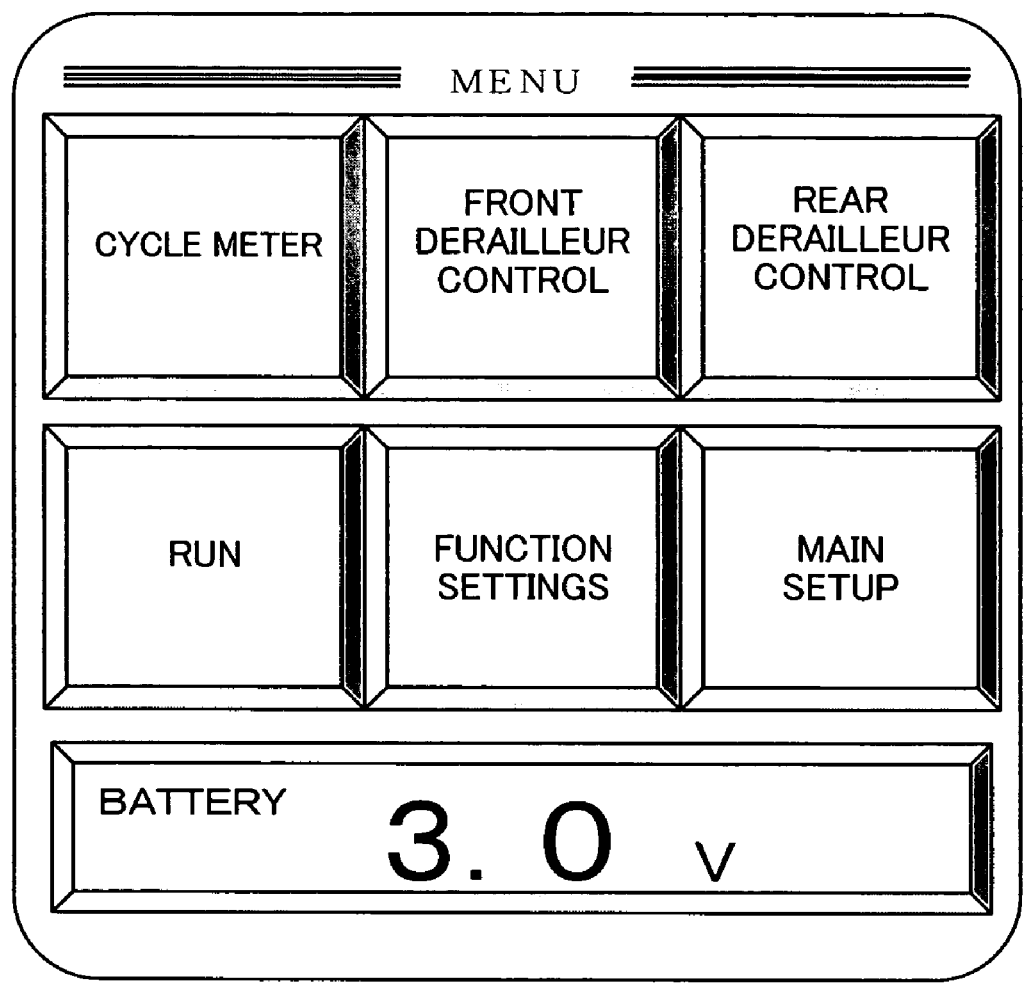
FIG. 7 is a display screen corresponding to the HOME MENU display mode of the cycle computer display apparatus, similar to FIG. 6, but with battery data shown.
Figure 8:
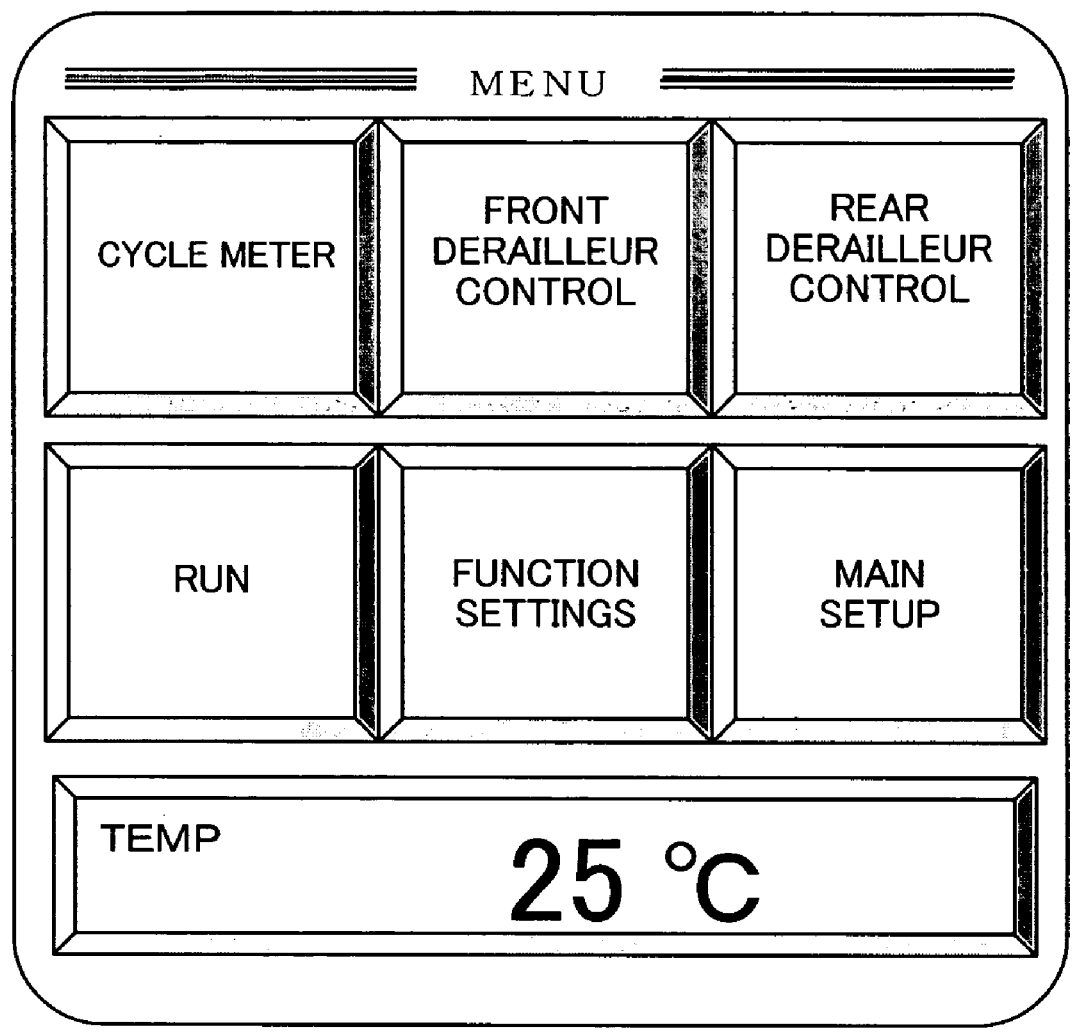
FIG. 8 is a display screen corresponding to the HOME MENU display mode of the cycle computer display apparatus, similar to FIG. 6, but with temperature data shown.
Figure 9:
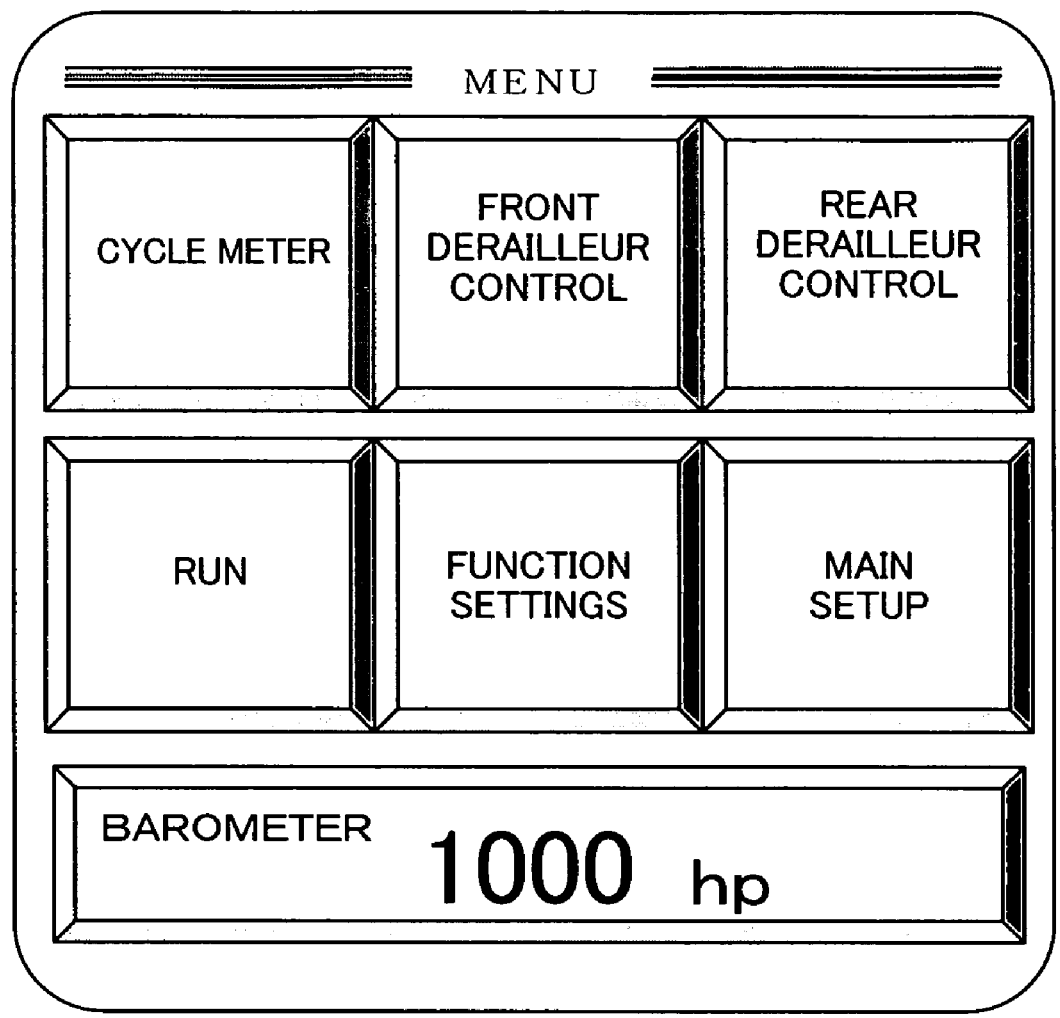
FIG. 9 is a display screen corresponding to the HOME MENU display mode of the cycle computer display apparatus, similar to FIG. 6, but with atmospheric data shown.
Figure 10:
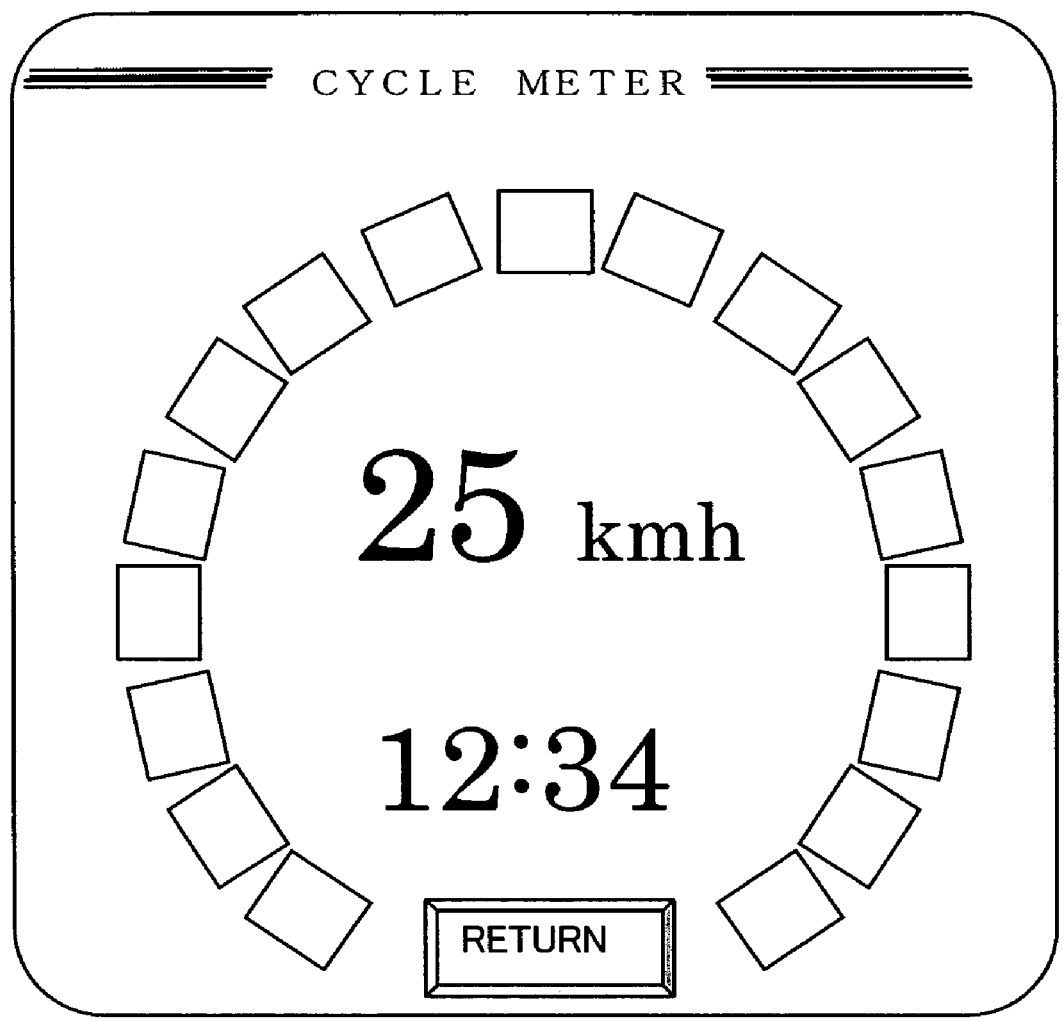
FIG. 10 is a display screen corresponding to the CYCLE METER display mode of the cycle computer display apparatus in accordance with the present invention.

As seen in FIGS. 4 and 5, the touch panel input unit or device 27 basically includes a transparent film 28, a first transparent resistive layer 29, a second transparent resistive layer 30, a glass substrate 31 and a plurality of dot spacers 32 disposed over an upper surface of the second transparent resistive layer 30 to form a fix gap there between. The transparent film 28 and the transparent resistive layer 29 are flexible enough to easily bend or to easily change its form when depressed by a finger or an object such that the resistive layers 29 and 30 can contact each other. Preferably, the dot spacers 32 are arranged in a grid like pattern to form a plurality of touch sensor areas as explained below, these touch sensor areas 33 are selectively grouped together to define a touch panel button. As will become apparent from the description below, the groupings of the touch sensor areas 33 change depending upon the display mode. Since touch panels are well known in the art, the touch panel input unit 27 will not be discussed or illustrated in detail herein. Accordingly, the touch sensors can be capacitive, resistive, surface acoustic wave (SAW) or grounded acoustic wave (GAW). Moreover, it will be apparent to those skilled in the art from this disclosure that although the display 26 is preferably a liquid crystal display (LCD), other types of display can also be utilized.

Referring now to FIGS. 6-9, the display screen of the cycle computer display apparatus 12 produces a plurality of visual images depending upon the signals sent by the controller. When the cycle computer display apparatus 12 is initially activated a home screen or HOME MENU display mode is produced on the display screen as seen in FIGS. 6-9. Preferably, the visual images produced on the display screen maximize the entire area of the display screen. Preferably, the controller includes a controlled program that allows the rider to customize the layout and displayed designed to sooth the riders' preferences.

In the first display mode, a menu screen is displayed on the display screen. Typically, the menu screen will have the most buttons or options for the rider to select. In the illustrated embodiment, seven button images are produced when the rider touches the touch panel input unit that is superimposed over the display screen, this will output a selection signal to the controller such that the controller will execute the appropriate control program. In the illustrated example, the button images include a cycle meter button image, a front derailleur control button image, a rear derailleur control button image, a run button image, a function setting button image, a main setup button image and a condition display button image.

In the HOME MENU display mode, the condition display button image includes environmental data within the area of the condition display button image. In the illustrated embodiment, the condition display button image will normally show a digital clock. As used herein, the phrase "environmental data" refers to an image that is correlated to data relating to the bicycle, rider or riding conditions and alike. Typically, environmental data is data that has either been recorded/stored or data that is currently being detected.

When the rider presses the condition display button image, preferably, the only area defining the condition display button image is changed. In particular, the condition display button image, when pushed, changes the environmental data within the area of the condition display button image so as to toggle or switch between a clock display, a battery data, a temperature data, and a barometer data as seen in FIGS. 6-9.

When the CYCLE METER button image is depressed, the screen display completely changes to a cycle meter display mode. In the CYCLE METER display mode, the controller 21 is configured to produce a plurality of visual images on the display screen that preferably includes speed, cadence and time as well as a return button image. In the CYCLE METER display mode, the user can touch the area near the display data to change the environmental data that is being displayed. For example, the time can be toggled or switched between battery data, temperature data or barometer data by touching the area of the display data to be changed. Likewise, the speed data can be switched or toggled to other data such as an average speed, a maximum speed, and odometer reading, etc. by touching the area of the display data to be changed.

Figure 11:
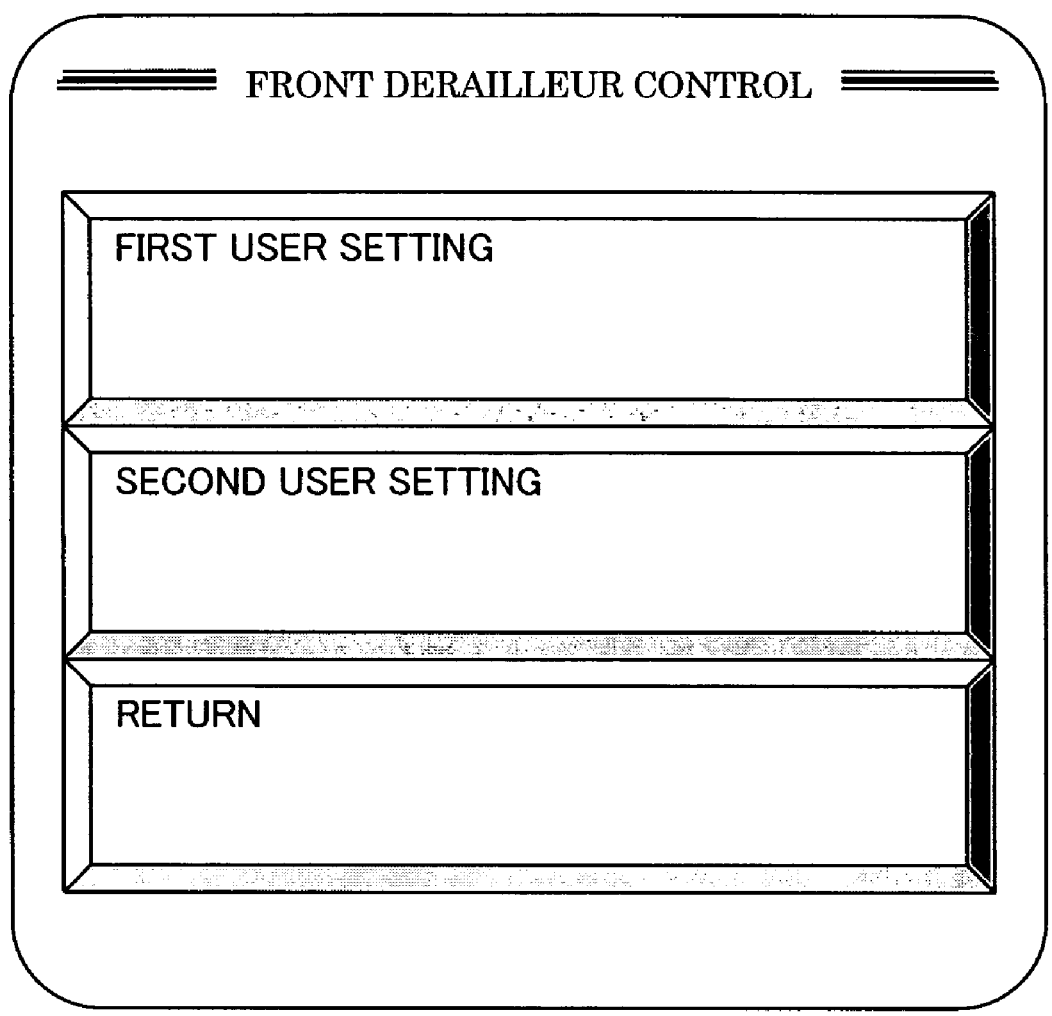
FIG. 11 is a display screen corresponding to the FRONT DERAILLEUR CONTROL display mode of the cycle computer display apparatus in accordance with the present invention.

When the rider depresses the front derailleur control button image, the controller switches the display screen from the HOME MENU display mode to the FRONT DERAILLEUR CONTROL display mode as seen in FIG. 11. In the FRONT DERAILLEUR CONTROL display mode, two automatic mode button images are produced, and one return button image is produced. Each of the button images are superimposed with selected areas of the touch panel unit such that the controller selectively defines a sensor area of the touch panel control unit that corresponds to each of the button images of the FRONT DERAILLEUR CONTROL display mode. Thus, when the rider presses on the touch panel input unit in the area corresponding to one of the button images, the controller executes the appropriate control program. Preferably, one of the button images in the FRONT DERAILLEUR CONTROL display mode includes a return button image in which the controller returns the display screen back to the HOME MENU display mode upon being depressed by the rider.

Figure 12:
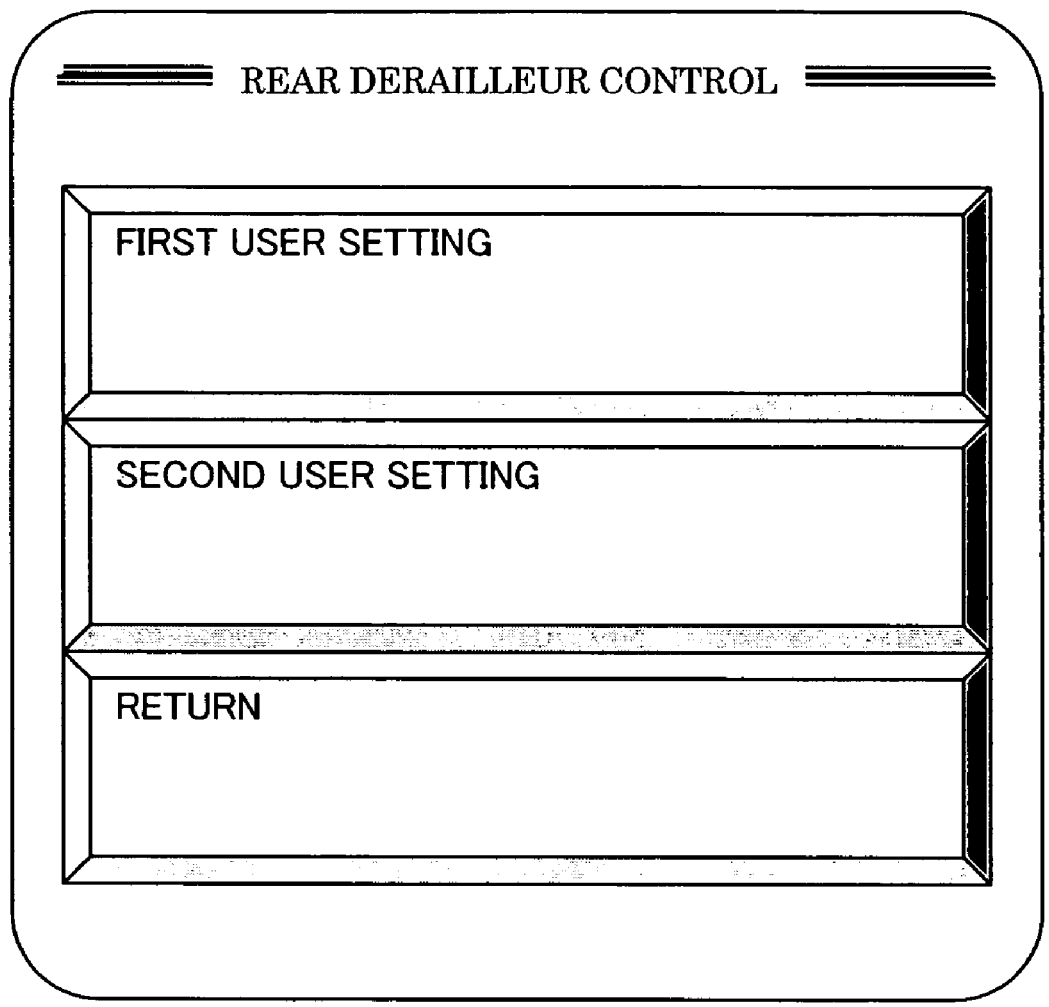
FIG. 12 is a display screen corresponding to the REAR DERAILLEUR CONTROL display mode of the cycle computer display apparatus in accordance with the present invention.

Referring back to FIG. 6, when the rider depresses the rear derailleur control button image, the controller switches the display screen to the REAR DERAILLEUR CONTROL display mode as seen in FIG. 12. Similar to the FRONT DERAILLEUR CONTROL display mode, the REAR DERAILLEUR CONTROL display mode includes two of automatic mode button images for the rider to select. When the rider selects one of these button images by depressing the touch panel input unit in the area of the button image, the controller executes the appropriate control program to the rear derailleur in accordance with various parameters detected by a controller.

Figure 13:
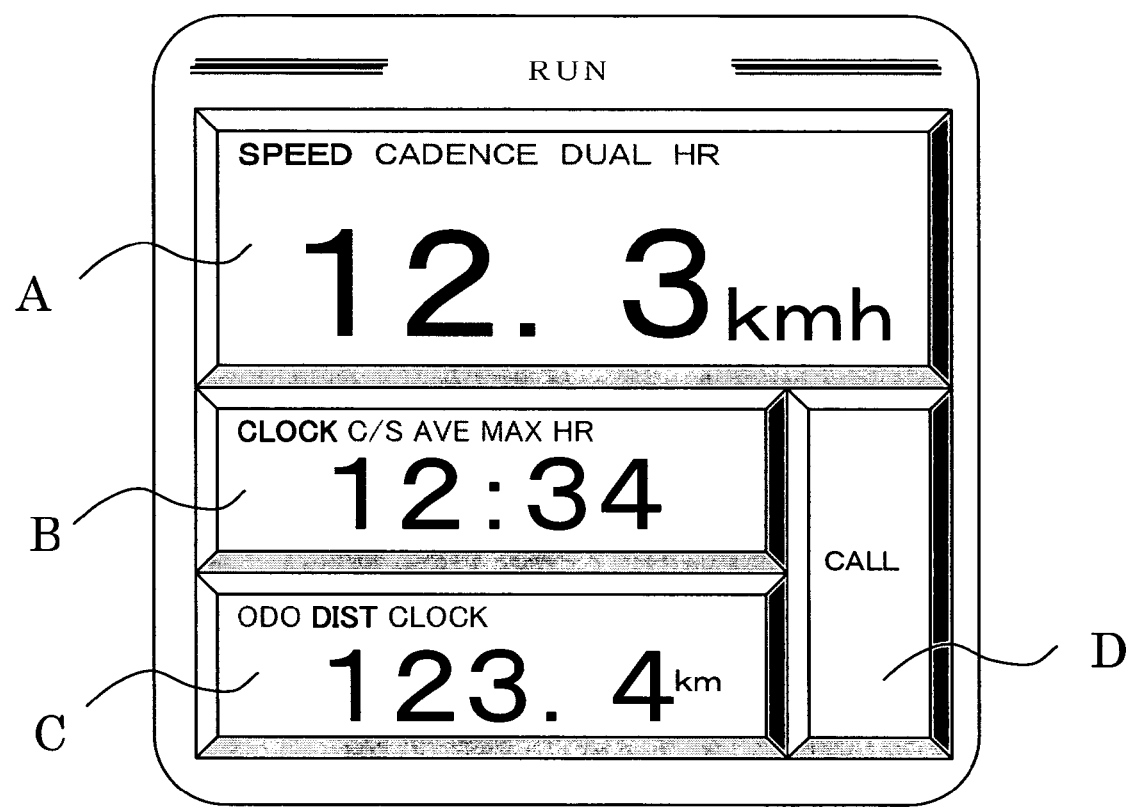
FIG. 13 is a display screen corresponding to the RUN display mode of the cycle computer display apparatus in accordance with the present invention.

Again referring to FIG. 6, when the rider depresses the run button image, the controller switches the display screen from the HOME MENU display mode to the RUN display mode as seen in FIG. 13. In the RUN display mode, four button images A-D are produced. Preferably, three of the four button images include environmental data that can be changed without changing overall screen display.

Figure 14:
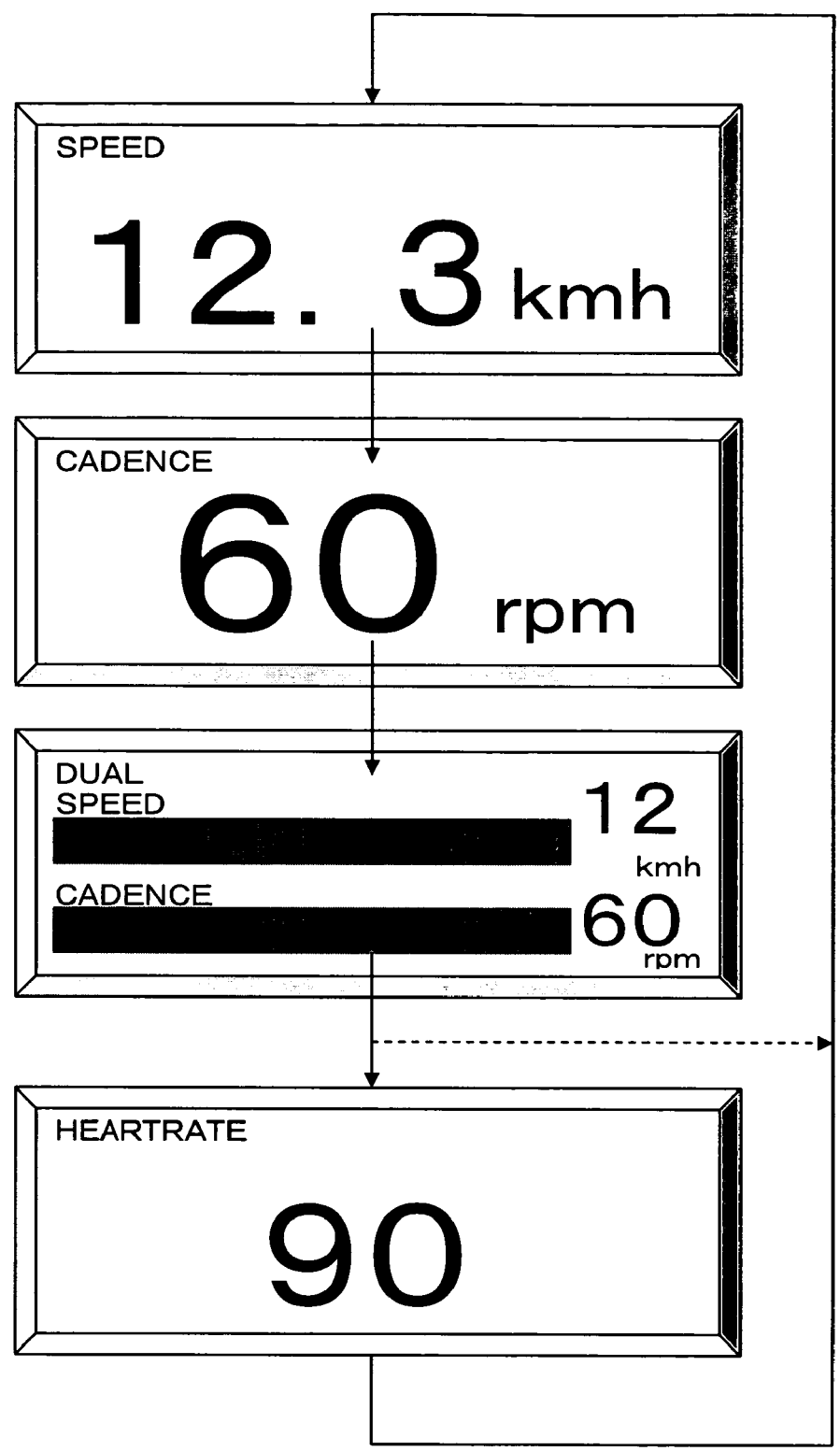
FIG. 14 is a display screen corresponding to the environmental data shown in the button image A of the RUN display mode of the cycle computer display apparatus in accordance with the present invention.

Preferably, the button image A can be switched between a plurality of data displays as seen in FIG. 14. In other words, when the rider presses the button image A, the RUN display mode remains the same, except the environmental data changes as shown in FIG. 14. Preferably, the environmental data can be changed from the speed data display to a cadence data display, a dual speed/cadence data display and a heart rate data display. Of course, anyone of the data displays can be eliminated and/or additional data displays can be added as needed and/or desired. For example, as shown in FIG. 14, the heart rate data display can be skipped if the electronic controller 21 determines that a heart rate monitor is not connected to the cycle computer display apparatus 12. This display can be set such that the button image A must be pressed each time to switch or toggle between each of the environmental data. Alternatively, display can be set to automatically cycle between the various data displays, with each data display pausing for a predetermined period of time at each individual type of environmental data before going on to the next environmental data.

Figure 15:
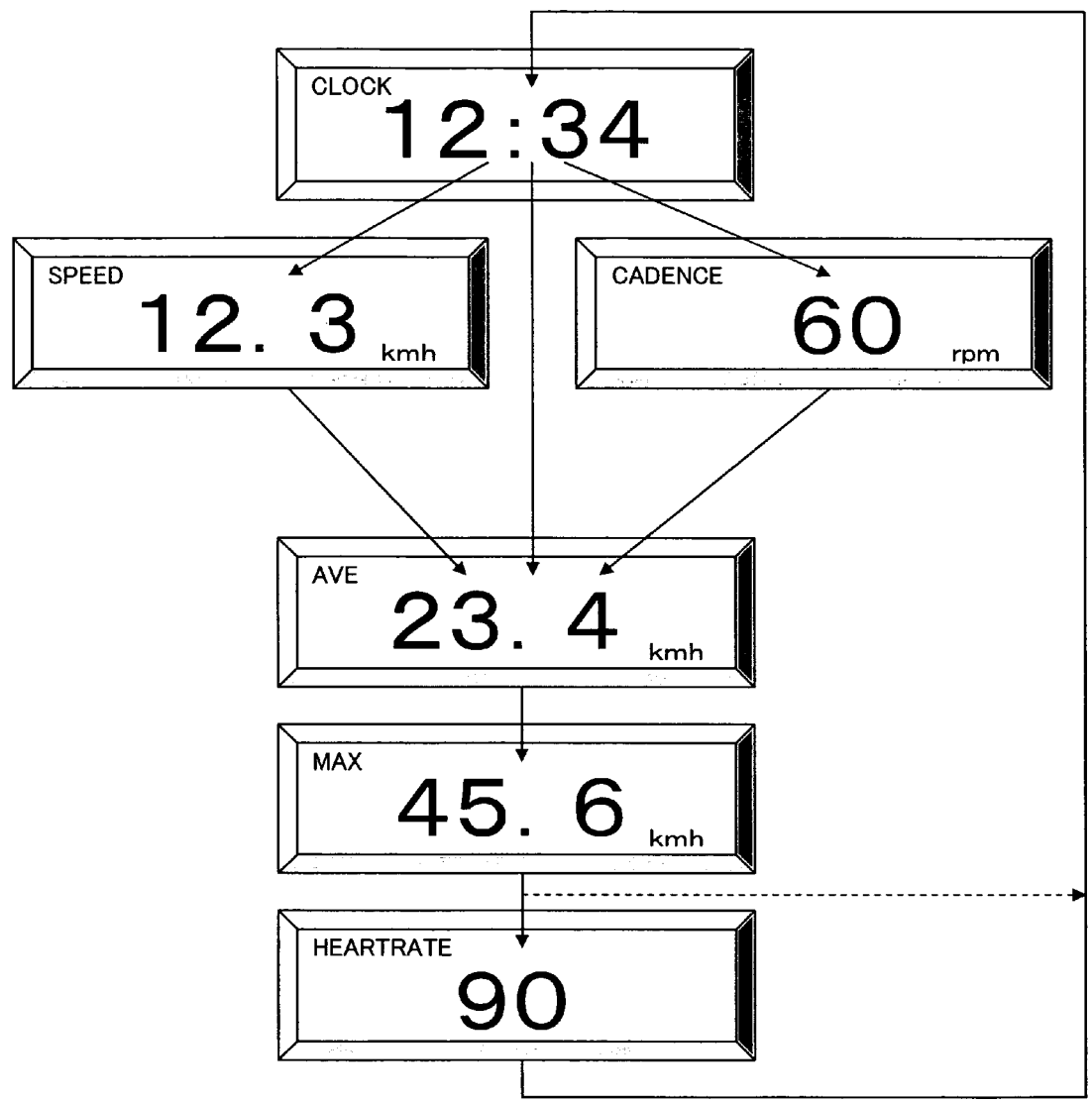
FIG. 15 is a display screen corresponding to the environmental data shown in the button image B of the RUN display mode of the cycle computer display apparatus in accordance with the present invention.
Figure 16:
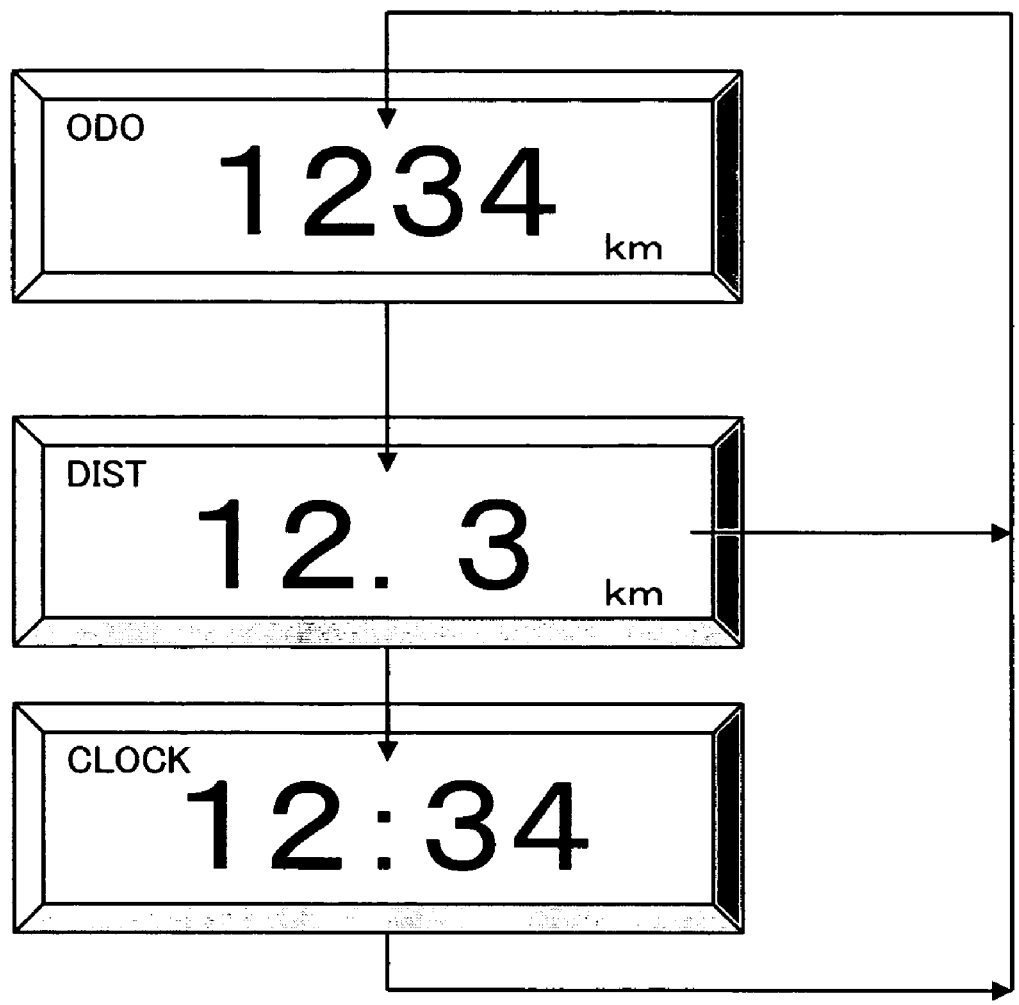
FIG. 16 is a display screen corresponding to the environmental data shown in the button image C of the RUN display mode of the cycle computer display apparatus in accordance with the present invention.

The button image B of the RUN display mode also preferably can be toggled or switched between various environmental data displays as shown in FIG. 15. Preferably, the environmental data can be changed from the clock display to a speed data display, a cadence data display, an average speed data display, a maximum speed data display and a heart rate data display. Moreover, depending upon the environmental data being produced in the button image A, this will affect the environmental display that is being produced in the button image B. For example, if speed is being produced and displayed in the button image A, then the button image B will not display the speed data display when the rider presses the button image B the button image B. However, if cadence is being produced and displayed in the button image A, then the button image B will not display the cadence data display when the rider presses the button image B. Likewise, when a dual meter display (speed and cadence) is being produced and displayed in the button image A, the display of environmental data in button image B will skip displaying the speed and cadence data displays when the rider presses button image B. Of course, anyone of the data displays can be eliminated and/or additional data displays can be added as needed and/or desired. For example, as shown in FIG. 15, the heart rate data display can be skipped if the electronic controller 21 determines that a heart rate monitor is not connected to the cycle computer display apparatus 12. Similar to the data display within button image A, the data display within button image B can be set such that the button image B must be pressed each time to switch or toggle between each of the environmental data. Alternatively, display can be set to automatically cycle between the various data displays, with each data display pausing for a predetermined period of time at each individual type of environmental data before going on to the next environmental data.

Regarding the button image C, preferably three different types of environmental data can be produced by the controller in the area of the button image C. For example, when the button image C is touched by the rider, the environmental data switches or toggles between odometer data, distance data and time.

Figure 17:
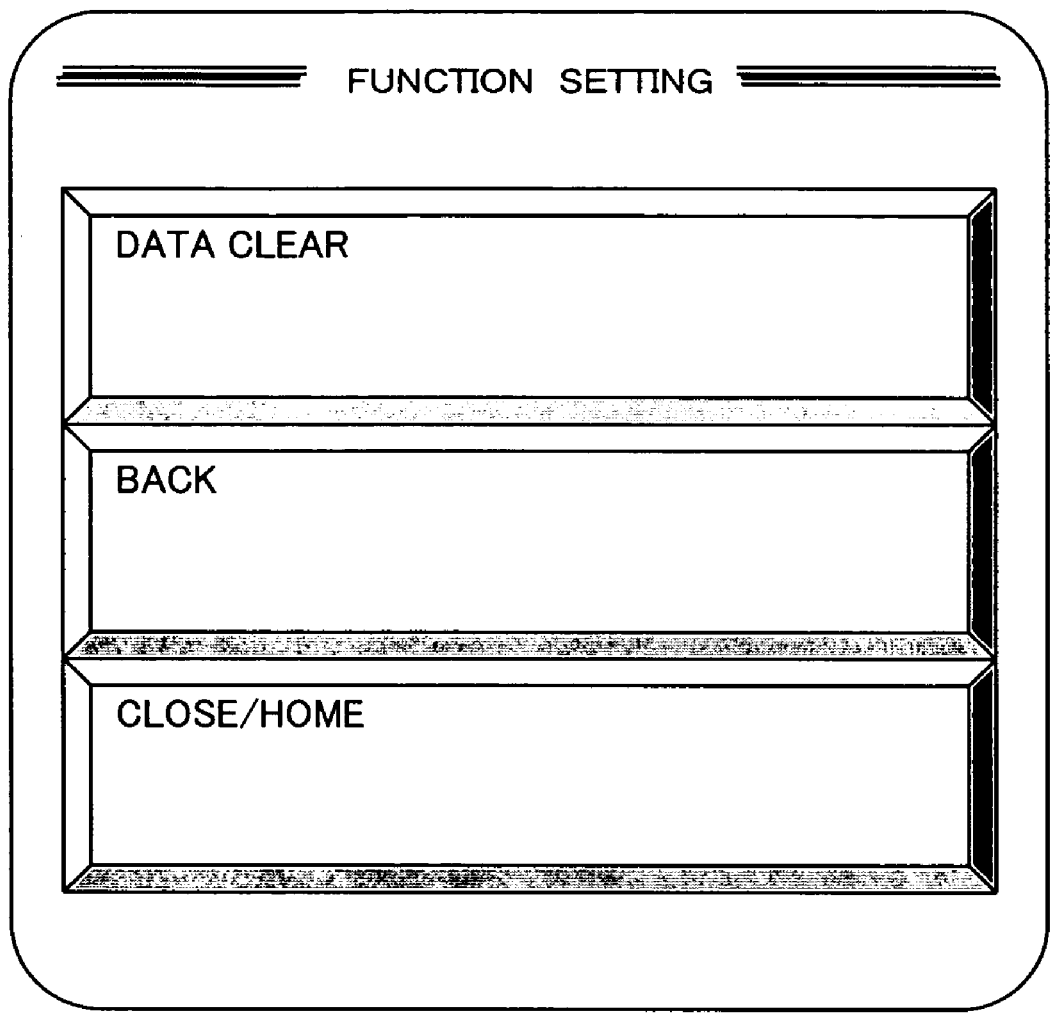
FIG. 17 is a display screen corresponding to the FUNCTION SETTING display mode of the cycle computer display apparatus in accordance with the present invention.

The button image D of the RUN display mode can be touched in order to change the RUN display mode to the FUNCTION SETTING mode as seen in FIG. 17.

Figure 18:
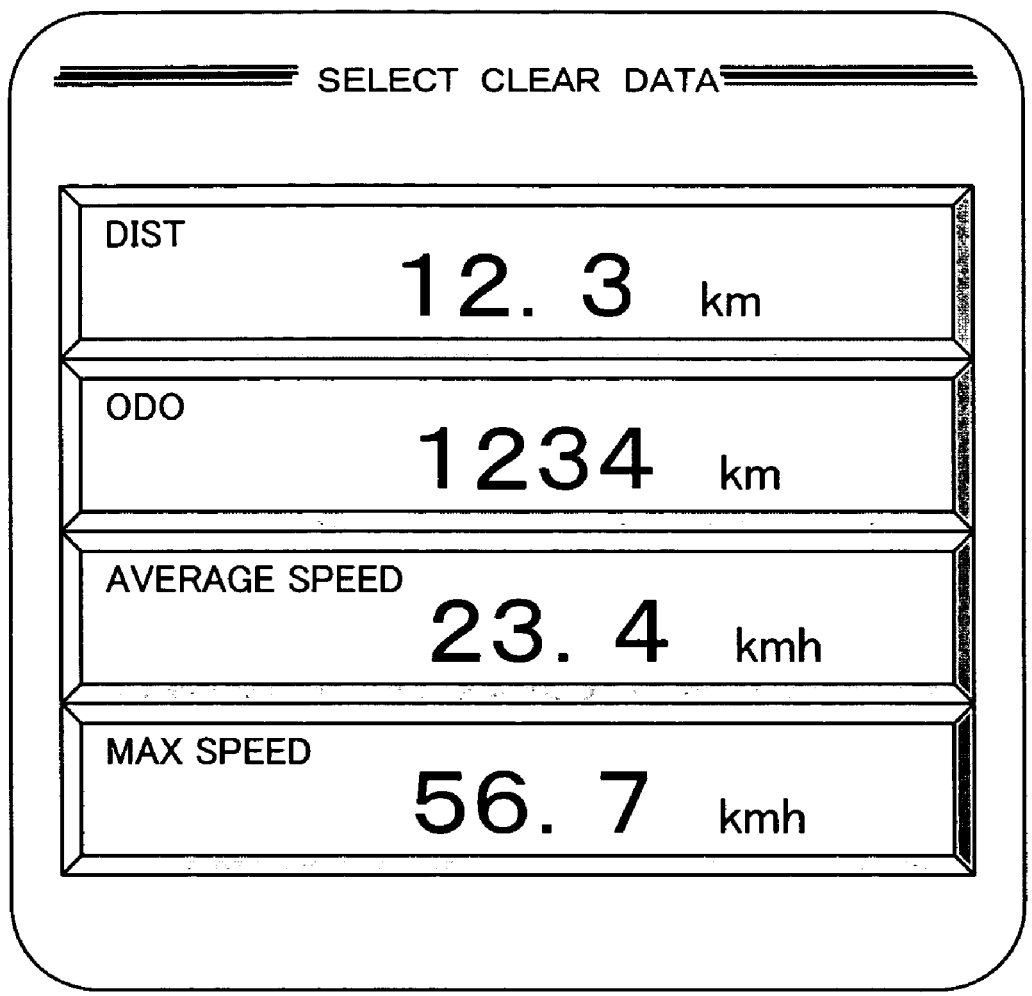
FIG. 18 is a display screen corresponding to the SELECT CLEAR DATA display mode of the cycle computer display apparatus in accordance with the present invention.
Figure 19:
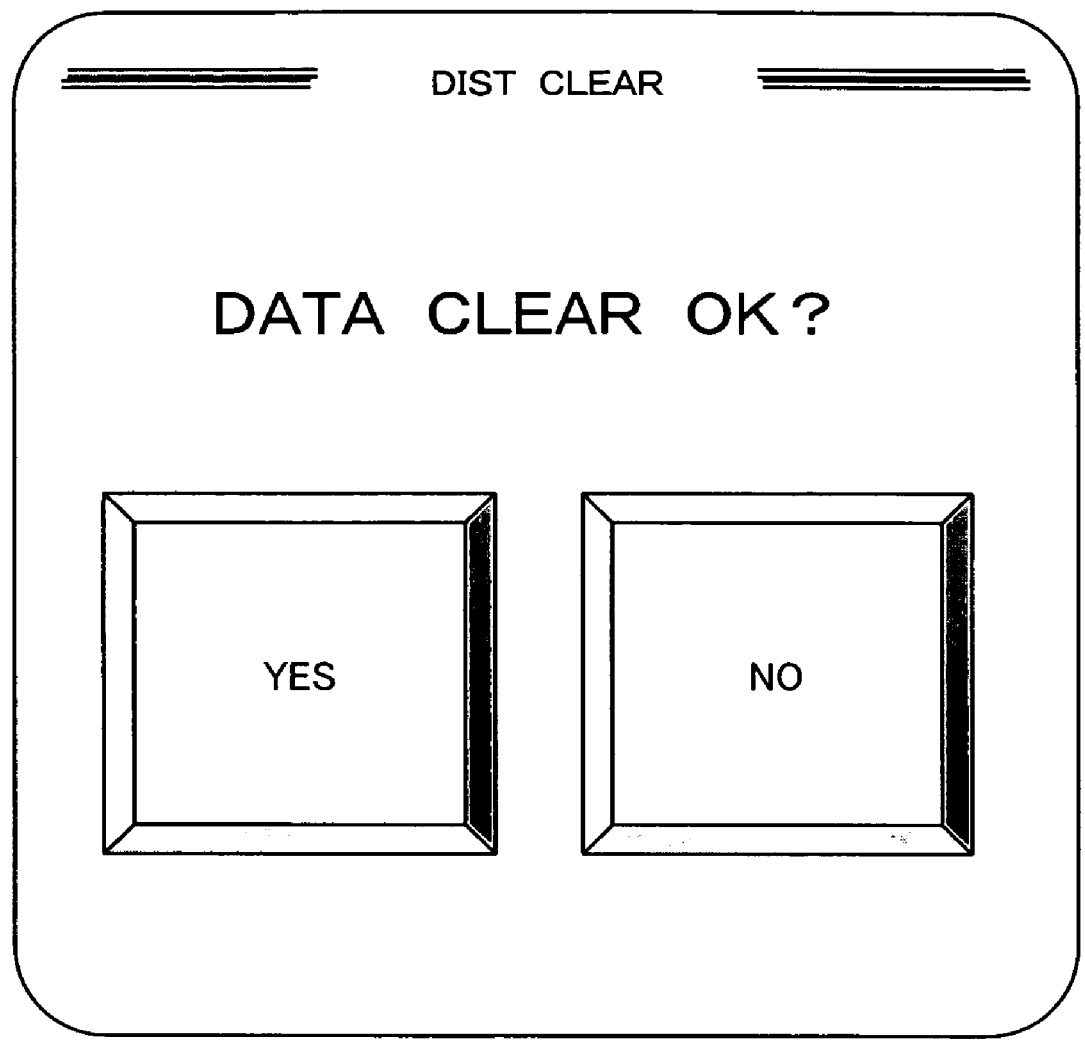
FIG. 19 is a display screen corresponding to the CLEAR display mode of the cycle computer display apparatus in accordance with the present invention.

Referring now to FIG. 17, the FUNCTION SETTING display mode can be accessed either from the HOME MENU display mode or the RUN display mode by pressing the appropriate button image. In the FUNCTION SETTING display mode, the controller produces three button images, e.g., a data clear button image, a back button image, and a close/home button image. When the data clear button image is depressed, the controller switches to the SELECT CLEAR DATA display mode as seen in FIG. 18. When the display screen produces the SELECT CLEAR DATA display mode, four button images are displayed that correspond to various pre-stored data when any one of these buttons is touched, the CLEAR display mode is produced on the display screen with two button images and indicia prompting the rider if "DATA CLEAR OK?" Thus, the CLEAR display mode has a yes button image and a no button image. If the yes button image is touched, than the memory in the controller that stores the particular data will be cleared and the display screen returns back to the FUNCTION SETTING display mode. If the no button image is touched, then the data is not cleared and the display screen returns back to the FUNCTION SETTING display mode.

Referring back to FIG. 17, when the back button image of the FUNCTION SETTING display mode is depressed, the display screen returns to the immediate preceding screen, e.g. the RUN display mode as seen in FIG. 13. On the other hand, if the close/home button image is touched, the screen display returns to the HOME MENU display mode as seen in FIG. 17.

Figure 20:
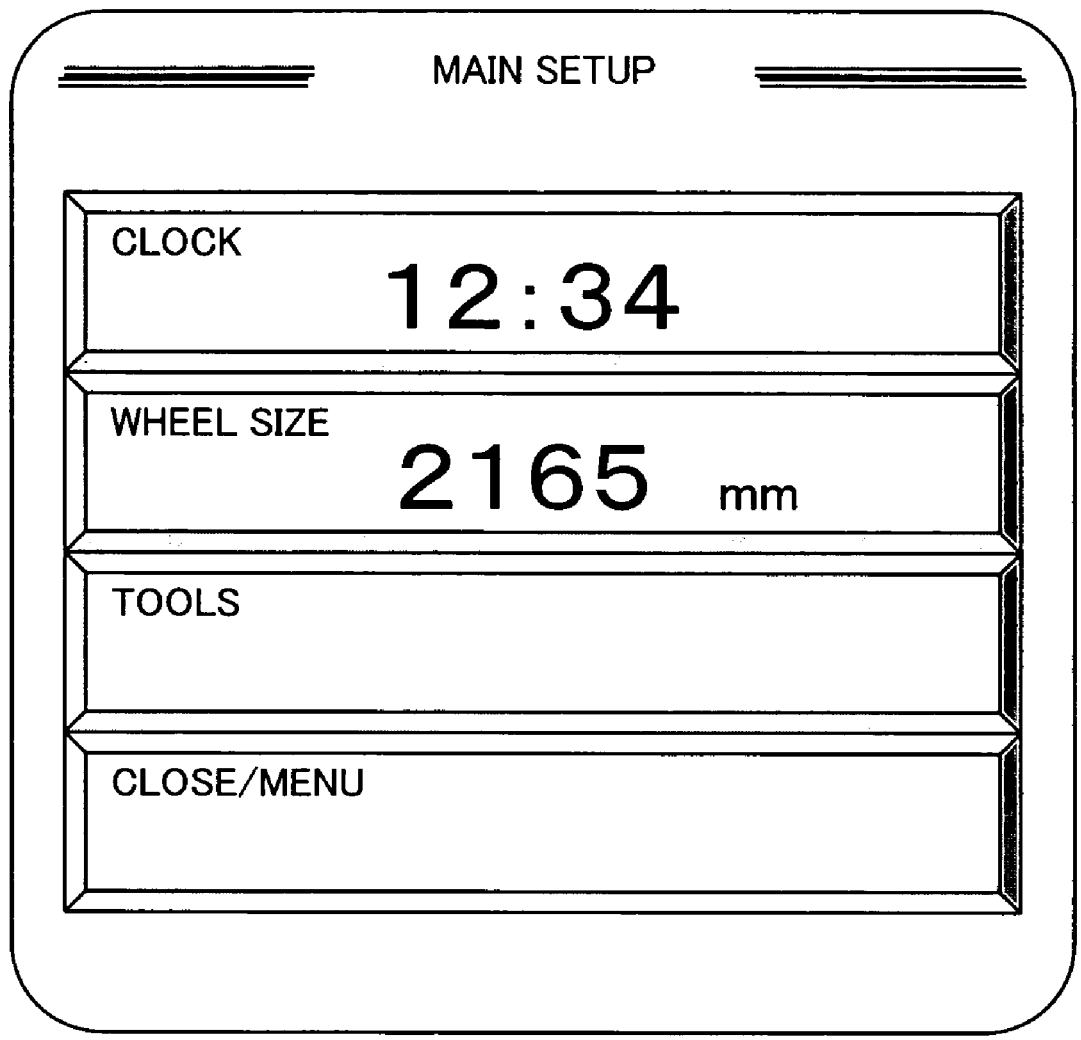
FIG. 20 is a display screen corresponding to the MAIN SETUP display mode of the cycle computer display apparatus in accordance with the present invention.
Figure 21:
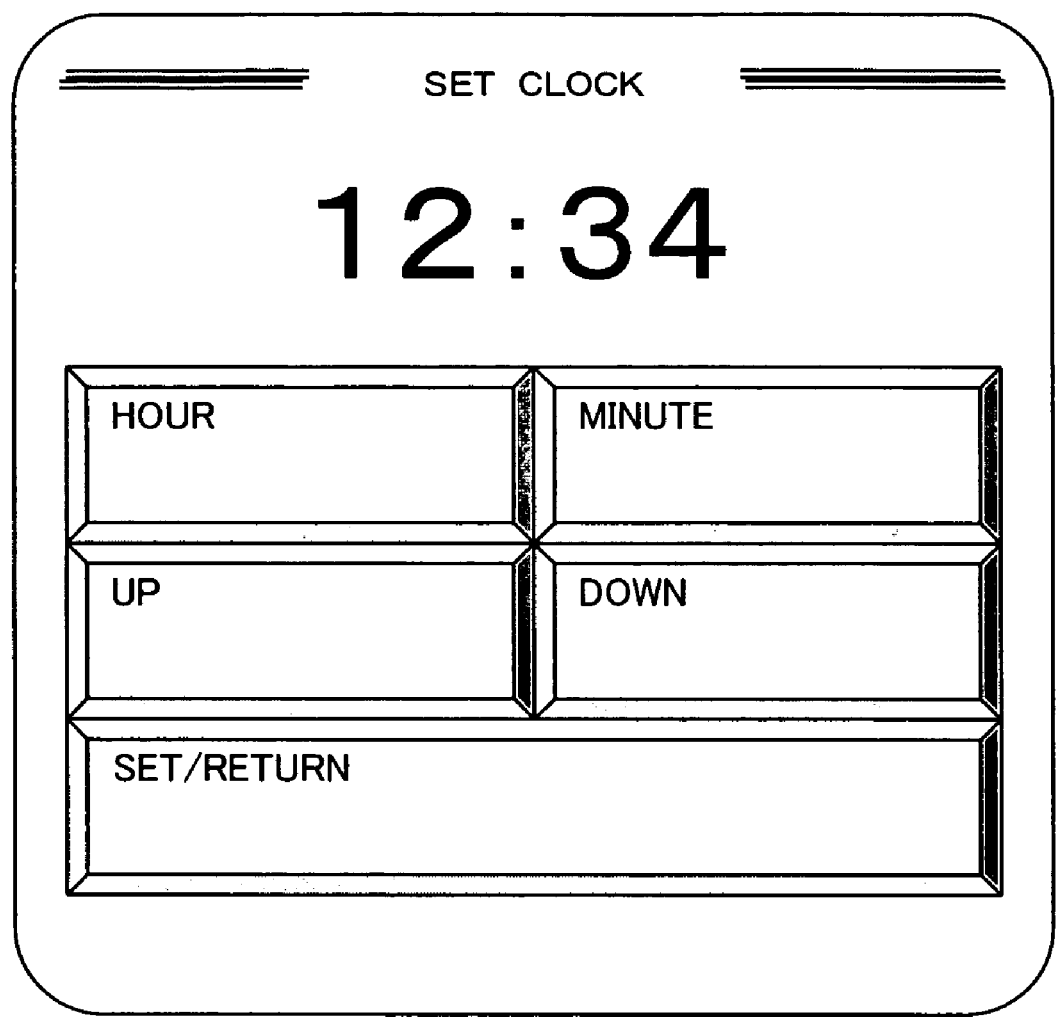
FIG. 21 is a display screen corresponding to the SET CLOCK display mode of the cycle computer display apparatus in accordance with the present invention.
Figure 22:
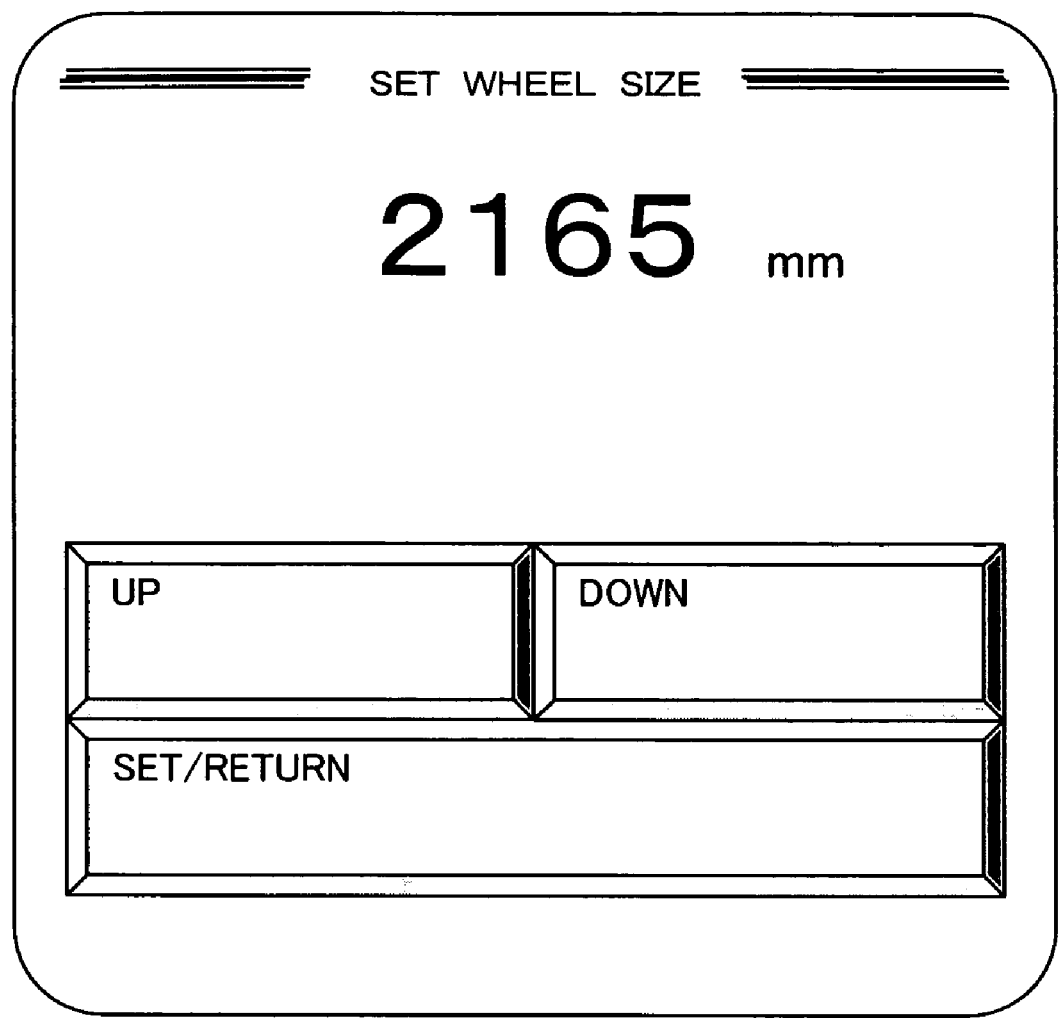
FIG. 22 is a display screen corresponding to the SET WHEEL SIZE display mode of the cycle computer display apparatus in accordance with the present invention.

Referring back to FIG. 6, when the main setup button image is depressed, the controller switches the screen display from the HOME MENU display mode to the MAIN SETUP display mode as seen in FIG. 20. In the MAIN SETUP display mode, four button images are produced. Thus, the controller then correlates the touch panel input unit with the button images. In other words, sensor areas of the touch panel input unit that corresponds to the button images are set by the controller such that when the rider touches the touch panel unit in the area that corresponds to the button image, the controller will execute the appropriate control program.

In the illustrated embodiment, the MAIN SETUP display mode includes a clock set button image, a wheel size button image, a tools image, and a close/menu button image. If the rider touches the clock set button image, the controller will switch from the MAIN SETUP display mode to be SET CLOCK display mode in which five button images are produced for changing and setting the clock. Preferably, the button images include an hour button image, a minute button image, an up button image, and a set/return button image. When the hour button image is touched, the hour portion of the digital time that it displayed begins to flash. Thus, pushing either the up or down button images will change the hour portion of the clock image. Once the desired hour is reached, the rider presses the set/return button image to store the new hour for the clock in the memory of the controller. Likewise, the minutes of the clock can be set by first depressing the minute button image. By touching the minute button image, the minute data on the display screen begins to flash. Thus, when the user then touches either the up or down button images, this will adjust the minute setting being displayed. Finally, the rider sets or stores the new minute setting by touching the set/return button image. When the clock is fully set, the set/return button image is depressed again, which causes the SET CLOCK display mode to switch back to the MAIN SETUP display mode.

If the wheel size button image is touched, then the controller switches the screen display from the MAIN SETUP display mode to the SET WHEEL SIZE display mode. In the SET WHEEL SIZE display mode, the display screen has three button images displays the current setting for the wheel size of the bicycle. By touching either the up or down button images, the rider can adjust the data displayed on the display screen. The set/return button image is pressed to set the new setting for the wheel size. When the set/return button image is pressed the second time, the controller switches form the SET WHEEL SIZE display mode back to the MAIN SETUP display mode.

If the rider depressed the tools button image, the controller switches from the MAIN SETUP display mode to the TOOLS display mode. In the TOOLS display mode, the controller produces four button images. Preferably, the TOOLS display mode includes a display design button image, a sound button image, a data view button image, and a close/menu button image. When any one of these button images is touched, the controller switches the display screen from the TOOLS display mode to a different display mode.

If the rider touches the display design button image, the controller will switch the display screen from the TOOLS display mode to the DISPLAY DESIGN display mode which the rider can select a different display design. In particular, the DISPLAY DESIGN display mode has a variety of display design that can be selected. In particular, the DISPLAY DESIGN display mode has two button images that allow the rider to select and set a new display design. When the rider touches the select button image, the display changes to indicate a new selection, e.g., the triangle moves vertically between various selections. Once the appropriate selection is marked, the rider touches the set/return button image which will set the new display design. When the rider touches the set/return button image again, the DISPLAY DESIGN display mode switches back to the TOOLS display mode.

When the rider selects the sound button image of the tools display mode, the controller switches from the TOOLS display mode to the SOUND display mode which operates in the same manner as the DISPLAY DESIGN display mode. Preferably, every time a button image is touched, one of the selected sounds will be heard.

Figure 23:
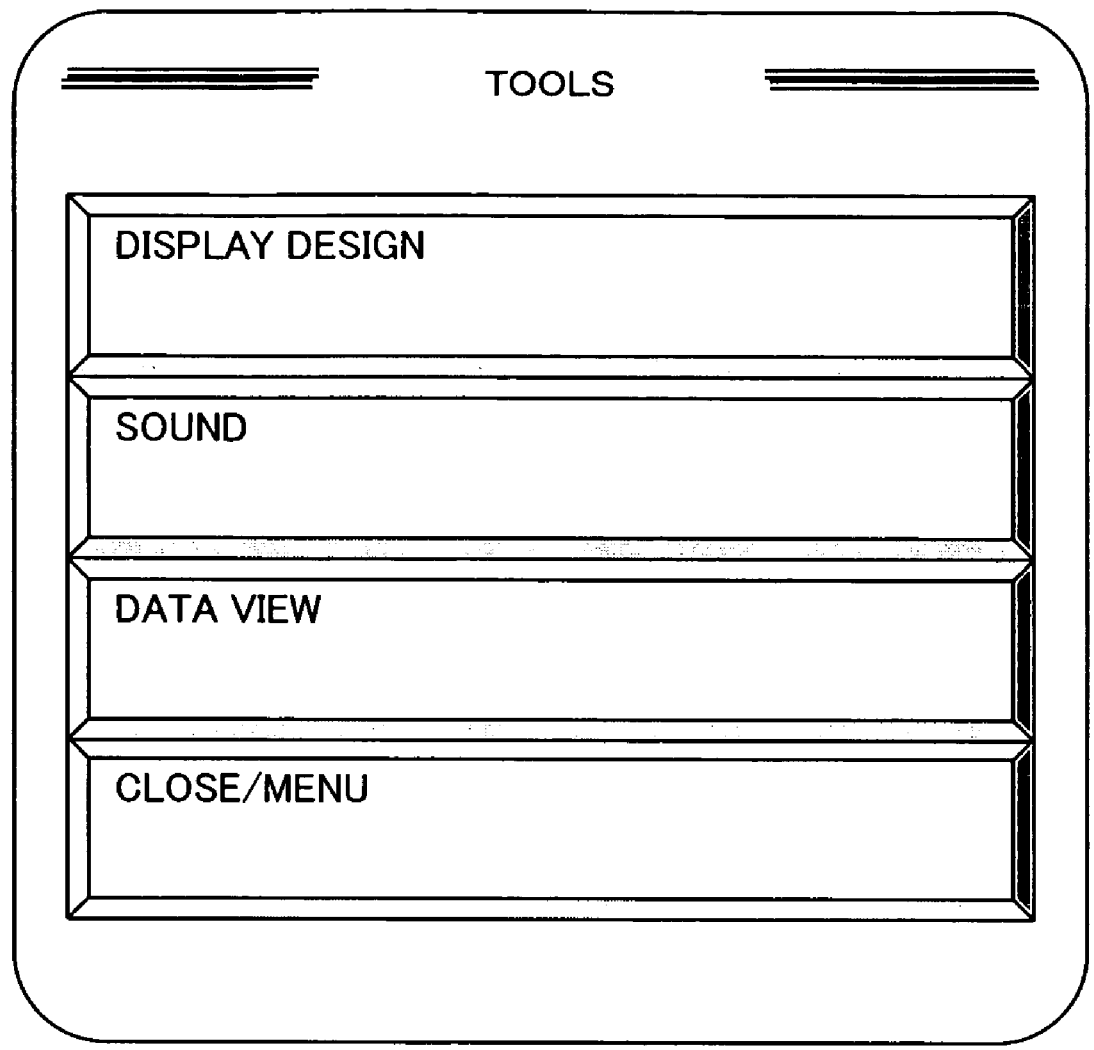
FIG. 23 is a display screen corresponding to the TOOLS display mode of the cycle computer display apparatus in accordance with the present invention.
Figure 24:
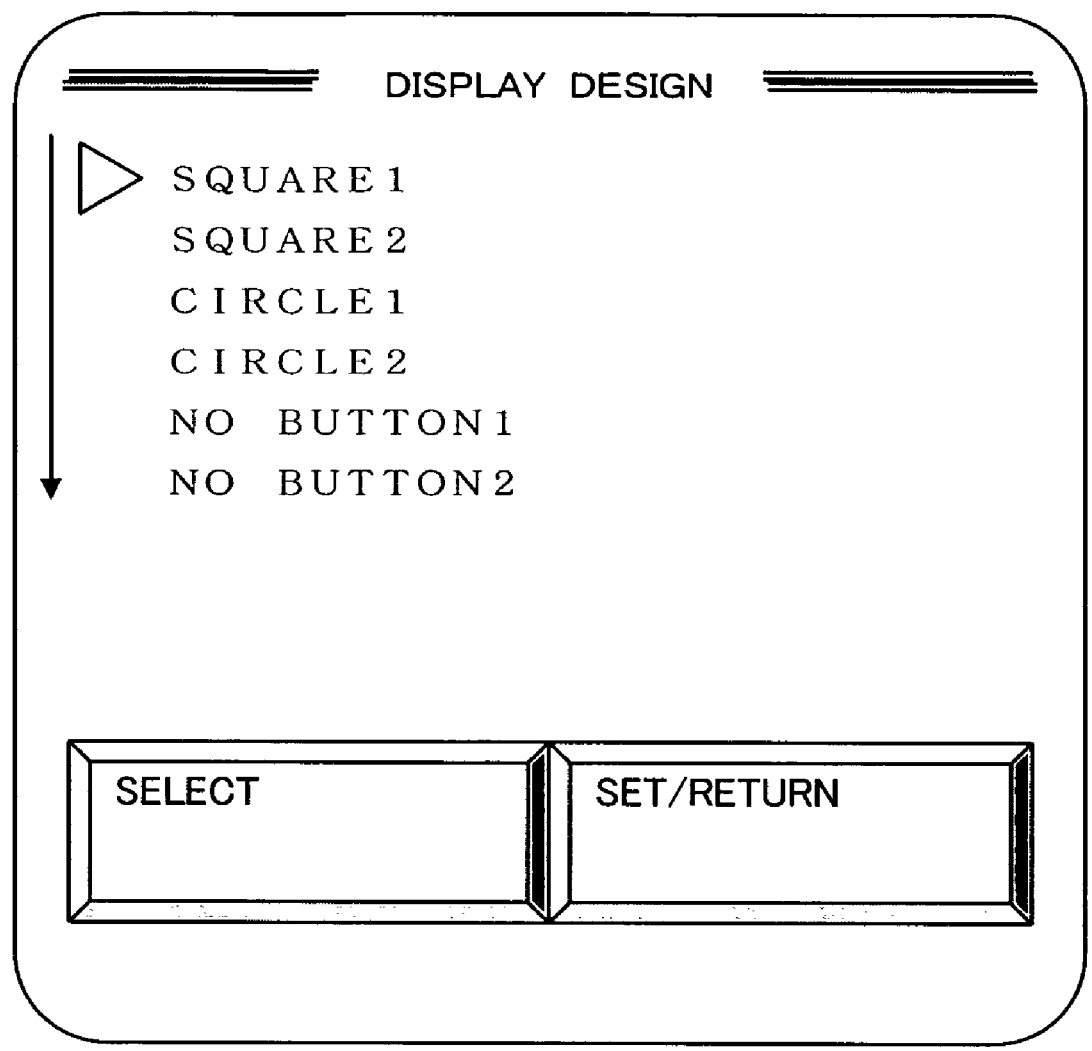
FIG. 24 is a display screen corresponding to the DISPLAY DESIGN display mode of the cycle computer display apparatus in accordance with the present invention.
Figure 25:
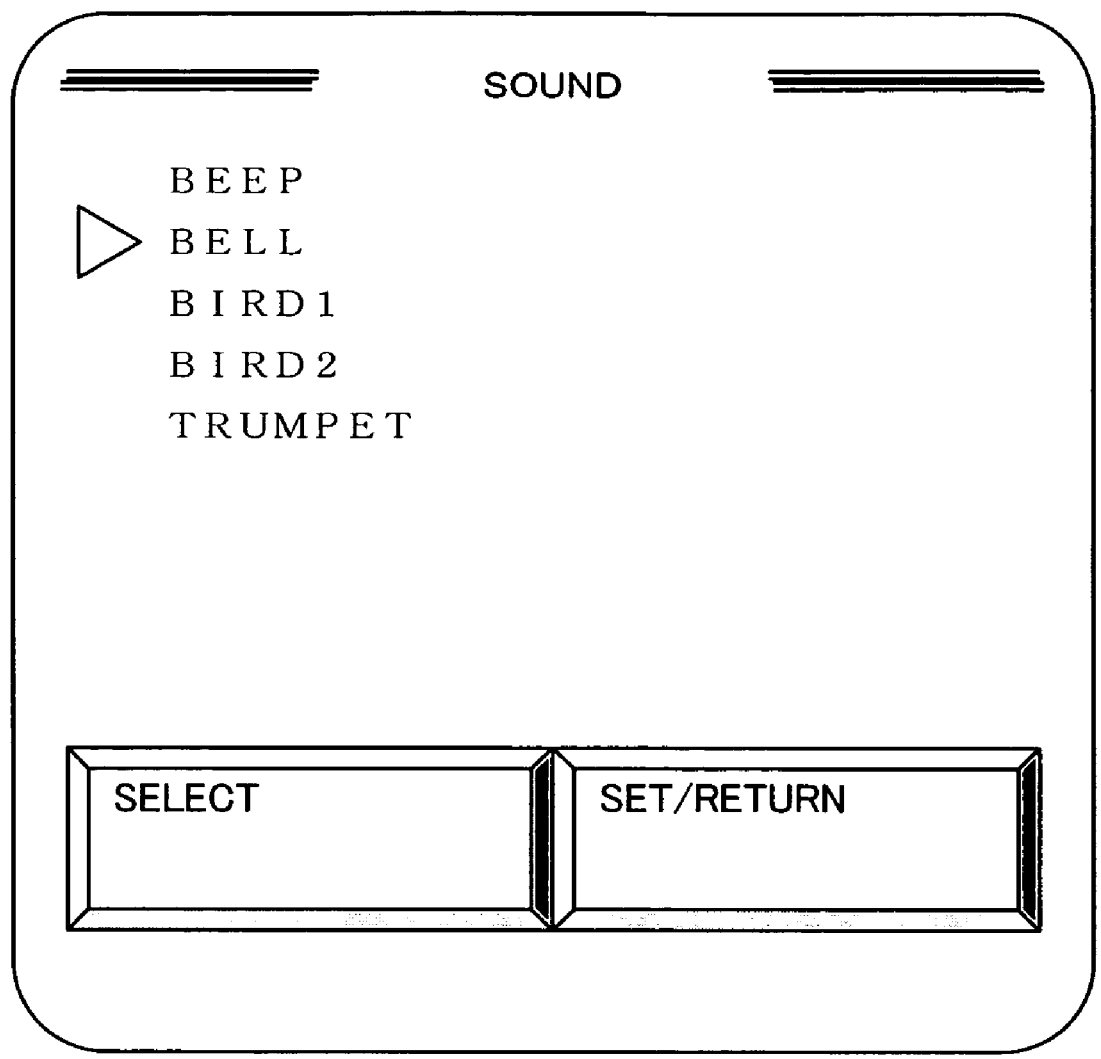
FIG. 25 is a display screen corresponding to the SOUND display mode of the cycle computer display apparatus in accordance with the present invention.
Figure 26:
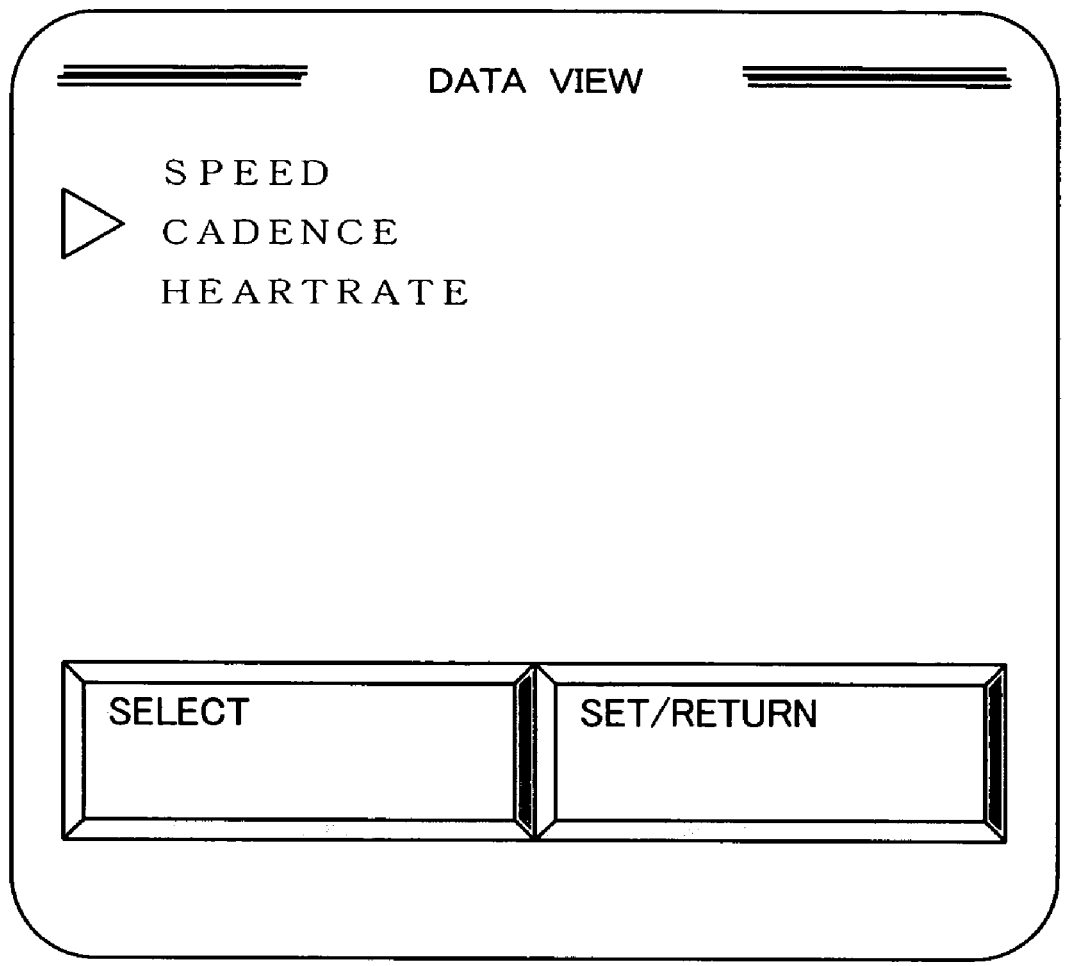
FIG. 26 is a display screen corresponding to the DATA VIEW display mode of the cycle computer display apparatus in accordance with the present invention.

Referring to FIG. 23, when the rider touches the data view button image on the TOOLS display mode, the controller switches to the DATA VIEW display MODE (FIG. 26) to adjust the preference for the data view to be reviewed. Again, the DATA VIEW display mode operates in the same manner as the DISPLAY DESIGN display mode and the SOUND display mode. Thus, DATA VIEW display mode will not be discusses in detail herein.

Figure 27:
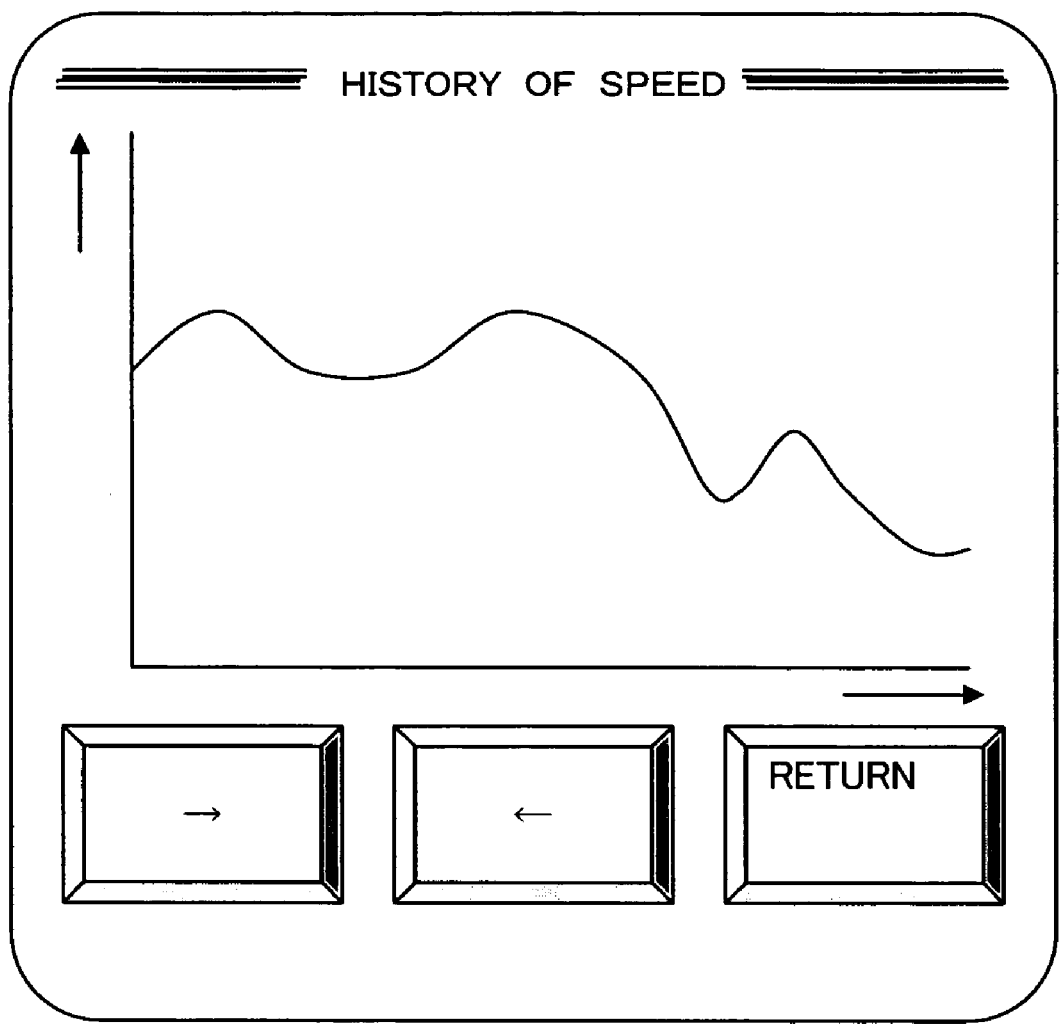
FIG. 27 is a display screen corresponding to the DATA HISTORY display mode of the cycle computer display apparatus in accordance with the present invention.

When one of the data views is selected, a recorded history display screen is produced for that particular data as seen in FIG. 27.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A cycle computer display apparatus comprising:
a display screen configured to produce visual images;
a touch panel input unit associated with at least a portion of the display screen that produces at least one output selection signal upon being touched; and
a controller configured to selectively control the visual images displayed on the display screen, the controller being configured to selectively display a plurality of button images on the display screen in a first display mode and to selectively display at least three different bicycle environmental data displays within a first button image of the button images in the first display mode, the controller being further configured to switch the bicycle environmental data display displayed in the first button image between the at least three different bicycle environmental data displays in response to receiving an output selection signal from the touch panel input unit when the first button image is touched without changing the remaining button images in the first display mode.

2. The cycle computer display apparatus according to claim 1, wherein
one of the button images is a mode-change button image, which does not display the at least three different bicycle environmental data displays in the first display mode, and
the controller is configured to switch to a second display mode upon receiving an output selection signal from the touch panel input unit when the mode-change button image is touched in the first display mode.

3. The cycle computer display apparatus according to claim 2, wherein
the controller is configured to selectively display a plurality of button images on the display screen in the second display mode that are different from the button images displayed in the first display mode.

4. The cycle computer display apparatus according to claim 3, wherein
the button images in the first display mode have different sizes and locations to those in the second display mode.

5. The cycle computer display apparatus according to claim 3, wherein
the number of button images in the first display mode is different than the number of button images in the second display mode.

6. The cycle computer display apparatus according to claim 1, wherein
the controller is configured to selectively display the at least three different bicycle environmental data displays within a second button image of the button images in the first display mode.

7. The cycle computer display apparatus according to claim 6, wherein
the controller is further configured to switch the bicycle environmental data display displayed in the second button image between the at least three different bicycle environmental data displays in response to receiving an output selection signal from the touch panel input unit when the second button image is touched, and
the controller is further configured to not display in the second button image the bicycle environmental data display that is displayed in the first button image when the second button image is touched.

8. The cycle computer display apparatus according to claim 1, wherein
the first button image has a larger area than an area of each of the remaining button images in the first display mode.

9. The cycle computer display apparatus according to claim 1, wherein
the controller is further configured to automatically switch between the at least three different bicycle environmental data displays after a predetermined period of time.

10. A cycle computer display apparatus comprising:
a display screen configured to produce visual images;
a touch panel input unit associated with at least a portion of the display screen that produces output selection signals upon being touched; and
a controller configured to selectively control the visual images displayed on the display screen, the controller being configured to selectively display a plurality of button images on the display screen in a first display mode, to selectively display one of at least three different bicycle environmental data within a first button image of the button images in the first display mode, and to selectively display one of the at least three different environmental data displays in a second button image of the button images in the first display mode,
the controller being further configured to selectively display at least one of the at least three different bicycle environmental data displays within either of the first or second button images without changing the size, shape or location of the first and second button images in the first display mode.

11. The cycle computer display apparatus according to claim 10, wherein
one of the button images is a mode-change button image, which does not display the at least three different bicycle environmental data displays in the first display mode, and
the controller is configured to switch to a second display mode upon receiving an output selection signal from the touch panel input unit when the mode-change button image is touched in the first display mode.

12. The cycle computer display apparatus according to claim 11, wherein
the controller is configured to selectively display a plurality of button images on the display screen in the second display mode that are different from the button images displayed in the first display mode.

13. The cycle computer display apparatus according to claim 12, wherein
the button images in the first display mode have different sizes and locations to those in the second display mode.

14. The cycle computer display apparatus according to claim 12, wherein
the number of button images in the first display mode is different than the number of button images in the second display mode.

15. The cycle computer display apparatus according to claim 10, wherein
one of the first and second button images has a larger area than an area of each of the remaining button images in the first display mode.

16. The cycle computer display apparatus according to claim 10, wherein
the controller is further configured to selectively display the at least three different bicycle environmental data displays within a third button image of the button images in the first display mode.

17. The cycle computer display apparatus according to claim 10, wherein
the controller is further configured to switch the bicycle environmental data display displayed in the first button image between the at least three different bicycle environmental data displays in response to receiving an output selection signal from the touch panel input unit when the first button image is touched,
the controller is further configured to switch the bicycle environmental data display displayed in the second button image between the at least three different bicycle environmental data displays in response to receiving an output selection signal from the touch panel input unit when the second button image is touched, and
the controller is further configured to not display in the second button image the bicycle environmental data display that is displayed in the first button image when the second button image is touched.

* * * * *